United States Patent
Kikuchi et al.

(10) Patent No.: US 10,053,556 B2
(45) Date of Patent: Aug. 21, 2018

(54) BARRIER COATING COMPOSITIONS, COMPOSITES PREPARED THEREFROM, AND QUANTUM DOT POLYMER COMPOSITE ARTICLES INCLUDING THE SAME

(71) Applicant: SAMSUNG ELECTRONICS CO., LTD., Suwon-si, Gyeonggi-do (KR)

(72) Inventors: Tomoyuki Kikuchi, Hwaseong-si (KR); EunJoo Jang, Suwon-si (KR); Hyun A Kang, Suwon-si (KR); Nayoun Won, Suwon-si (KR); Oul Cho, Suwon-si (KR); Haeng Deog Koh, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 225 days.

(21) Appl. No.: 14/920,189

(22) Filed: Oct. 22, 2015

(65) Prior Publication Data

US 2016/0160060 A1    Jun. 9, 2016

(30) Foreign Application Priority Data

Dec. 5, 2014    (KR) ........................ 10-2014-0174445

(51) Int. Cl.
| | |
|---|---|
| *C09D 7/62* | (2018.01) |
| *H05B 33/12* | (2006.01) |
| *C09D 179/04* | (2006.01) |
| *C08K 9/04* | (2006.01) |
| *C08G 83/00* | (2006.01) |
| *C08F 2/38* | (2006.01) |
| *C08F 2/44* | (2006.01) |
| *B82Y 40/00* | (2011.01) |
| *B82Y 30/00* | (2011.01) |
| *B32B 9/04* | (2006.01) |
| *B32B 27/08* | (2006.01) |
| *B32B 27/28* | (2006.01) |
| *B32B 27/34* | (2006.01) |
| *B32B 27/36* | (2006.01) |
| *C08F 226/06* | (2006.01) |

(52) U.S. Cl.
CPC .................. *C08K 9/04* (2013.01); *C08F 2/38* (2013.01); *C08F 2/44* (2013.01); *C08G 83/00* (2013.01); *C09D 7/62* (2018.01); *C09D 179/04* (2013.01); *H05B 33/12* (2013.01); *B32B 9/04* (2013.01); *B32B 27/08* (2013.01); *B32B 27/281* (2013.01); *B32B 27/34* (2013.01); *B32B 27/36* (2013.01); *B32B 27/365* (2013.01); *B32B 2250/40* (2013.01); *B32B 2255/10* (2013.01); *B32B 2255/24* (2013.01); *B32B 2255/26* (2013.01); *B32B 2255/28* (2013.01); *B32B 2264/10* (2013.01); *B32B 2264/102* (2013.01); *B32B 2264/104* (2013.01); *B32B 2307/412* (2013.01); *B32B 2457/00* (2013.01); *B82Y 30/00* (2013.01); *B82Y 40/00* (2013.01); *C08F 226/06* (2013.01)

(58) Field of Classification Search
None
See application file for complete search history.

(56) References Cited

U.S. PATENT DOCUMENTS

| | | | |
|---|---|---|---|
| 5,164,460 A | | 11/1992 | Yano et al. |
| 5,747,560 A | * | 5/1998 | Christiani ................ C08K 9/04 523/209 |
| 6,156,835 A | * | 12/2000 | Anderson .............. C08G 59/42 524/445 |
| 6,337,046 B1 | | 1/2002 | Bagrodia et al. |
| 7,166,666 B2 | | 1/2007 | Ooba et al. |
| 7,776,404 B2 | | 8/2010 | Ronk et al. |
| 7,799,395 B2 | | 9/2010 | Ebina et al. |
| 8,007,895 B2 | | 8/2011 | Ebina et al. |
| 8,178,194 B2 | | 5/2012 | Ebina et al. |
| 8,206,814 B2 | | 6/2012 | Ebina et al. |
| 8,268,042 B2 | | 9/2012 | Lopez et al. |
| 8,268,108 B2 | | 9/2012 | Illsley et al. |
| 2006/0222797 A1 | | 10/2006 | Bekele |
| 2007/0106005 A1 | | 5/2007 | Bourgeois |
| 2007/0177528 A1 | | 8/2007 | Pearce |
| 2010/0203274 A1 | | 8/2010 | Illsley et al. |

(Continued)

FOREIGN PATENT DOCUMENTS

| | | |
|---|---|---|
| WO | 2006105273 A1 | 10/2006 |
| WO | 2014113562 A1 | 7/2014 |

OTHER PUBLICATIONS

Sigma-Aldrich Nanoclay surface modified catalog entry, Printed Nov. 27, 2017 (Year: 2017).*

(Continued)

*Primary Examiner* — Christopher M Rodd
(74) *Attorney, Agent, or Firm* — Cantor Colburn LLP

(57) ABSTRACT

A barrier coating composition including: a monomer combination including a first monomer having at least two thiol groups at its terminal end and a second monomer having at least two carbon-carbon unsaturated bond-containing groups at its terminal end; and a plurality of organo-modified clay particles dispersed in the monomer combination, wherein the organo-modified clay particles include a compound having a hydrocarbyl group linked to a heteroatom, and wherein the compound is a primary, secondary, or tertiary amine, a quaternary organoammonium salt, a primary, secondary, or tertiary phosphine, a quaternary organophosphonium salt, a thiol including an amine group, or a combination thereof.

29 Claims, 5 Drawing Sheets

(56) References Cited

U.S. PATENT DOCUMENTS

| | | |
|---|---|---|
| 2010/0323189 A1 | 12/2010 | Illsley et al. |
| 2011/0288224 A1 | 11/2011 | Gimenez Torres et al. |
| 2012/0113672 A1 | 5/2012 | Dubrow et al. |
| 2012/0272618 A1 | 11/2012 | Illsley et al. |
| 2012/0318700 A1 | 12/2012 | Illsley et al. |
| 2013/0071674 A1 | 3/2013 | Ebina et al. |
| 2015/0264186 A1 | 9/2015 | Pearce |

OTHER PUBLICATIONS

Joonwon Bae "Thiol-ene/clay nanocomposite thin film as novel transparent barrier" Polym Int 2012; 61: 895-900.

* cited by examiner

BARRIER COATING COMPOSITIONS, COMPOSITES PREPARED THEREFROM, AND QUANTUM DOT POLYMER COMPOSITE ARTICLES INCLUDING THE SAME

CROSS-REFERENCE TO RELATED APPLICATION

This application claims priority to and the benefit of Korean Patent Application No. 10-2014-0174445 filed in the Korean Intellectual Property Office on Dec. 5, 2014, the entire contents of which are incorporated herein by reference.

BACKGROUND

1. Field

Barrier coating compositions, composites prepared therefrom, and quantum dot-polymer composite articles including the same are disclosed.

2. Description of the Related Art

A light emitting particle may be dispersed in a polymer host matrix and may be used in various display devices as a composite. For example, a semiconductor nanocrystal called a quantum dot (QD) is dispersed in a host matrix of a polymer or an inorganic material, and thus may be used as a light conversion layer in a light emitting diode (LED) and the like. Particle size of the quantum dots may be relatively readily adjusted during colloid synthesis, and in addition, the particle sizes may be uniformly controlled. When the quantum dot has a size of less than or equal to about 10 nanometers (nm), a quantum confinement effect becomes significant, and thus, as the particle size decreases, the bandgap increases, and thereby the energy density becomes larger. Accordingly, the quantum dot may emit light in a visible light region with excellent luminous efficiency and thus, active research efforts have been focused on application of the quantum dot to various lighting devices, a light emitting diode (LED) for a backlight unit, and the like.

The quantum dot has theoretical quantum efficiency of about 100% and may emit light with a high color purity (e.g., of less than or equal to about 40 nm of a full width at half maximum (FWHM)). Thus, the quantum dot is expected to provide high luminous efficiency and improved color reproducibility compared to an inorganic phosphor used in a conventional art. However, since the quantum dot is a short-living nano-size particle, which is vulnerable, for example, to an external factor such as moisture or oxygen (unlike the inorganic phosphor, which is a micro-size particle), development of technology for overcoming this problem is needed. When the quantum dot is used in a quantum dot-polymer composite in a light emitting diode or a quantum dot sheet, it is important to well maintain a passivation layer on the surface of the quantum dot in order to secure its high efficiency and color purity. The quantum dot-polymer composite may have a barrier coating for protecting the quantum dot from moisture or oxygen, and as the barrier coating, a deposited metal oxide (e.g., formed by sputtering and the like) has been extensively used. However, a currently-used barrier coating shows an insufficient performance with regard to the economic or technological aspects of the device.

Thus, there remains a need in a new and efficient barrier coating that would be applicable to a quantum dot polymer composite.

SUMMARY

An embodiment provides a barrier coating composition that is applicable to a quantum dot polymer composite.

Another embodiment provides a clay-polymer composite for a barrier coating manufactured from the composition.

Yet another embodiment provides a quantum dot-polymer composite article including a barrier coating manufactured from the composition.

In an embodiment, a barrier coating composition includes:

a monomer combination including a first monomer having at least two thiol groups at its terminal end and a second monomer having at least two carbon-carbon unsaturated bond-containing groups at its terminal end; and a plurality of organo-modified clay particles dispersed in the monomer combination, wherein the organo-modified clay particles include a compound having a hydrocarbyl group linked to a heteroatom, and wherein the compound is a primary, secondary, or tertiary amine, a quaternary organoammonium salt, a primary, secondary, or tertiary phosphine, a quaternary organophosphonium salt, a thiol including an amine group, or a combination thereof.

In an embodiment, the barrier coating composition does not substantially include water or a solvent which is miscible with water.

The barrier coating composition may include an organic solvent in an amount of less than 10% based on the total weight of the composition.

The clay particles may be included in an amount of about 0.1 to about 20 parts by weight per 100 parts by weight of the monomer combination.

The clay particles may include smectite clay, mica clay, vermiculite clay, montmorillonite clay, iron-containing montmorillonite clay, beidellite clay, saponite clay, hectorite clay, stibensite clay, nontronite clay, anionic clay, zirconium phosphate, kaolinite, atapulgite, illite, halloysite, diatomaceous earth, fuller's earth, calcinated aluminum silicate, hydrated aluminum silicate, magnesium aluminum silicate, sodium silicate, magnesium silicate, or a combination thereof.

In an embodiment, the clay may be smectite clay.

The compound may include a primary, secondary, or tertiary amine compound having at least one substituted or unsubstituted C6 to C20 hydrocarbyl group linked to a nitrogen atom, a quaternary organoammonium salt compound having at least one substituted or unsubstituted C6 to C20 hydrocarbyl group linked to a nitrogen atom, a primary, secondary, or tertiary phosphine compound having at least one substituted or unsubstituted C6 to C20 hydrocarbyl group linked to a phosphorus atom, an organophosphonium salt compound having at least one substituted or unsubstituted C6 to C20 hydrocarbyl group linked to a phosphorus atom, and a C6 or greater thiol compound including amine group ($H_2N-$), or a combination thereof.

The compound may include hexylamine, a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, a triethyloctyl phosphonium salt, a tetraphenyl phosphonium salt, or a combination thereof. The clay particle may have a longest average diameter of about 50 nanometers to about 10 micrometers, and an average thickness of about 1 nanometer to about 10 nanometers.

The composition may have transmittance of greater than or equal to about 85% for visible light.

In the monomer combination, the first monomer may be represented by Chemical Formula 1.

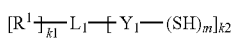

Chemical Formula 1

In Chemical Formula 1, $R^1$ is hydrogen; a substituted or unsubstituted C1 to C30 linear or branched alkyl group; a substituted or unsubstituted C6 to C30 aryl group; a substituted or unsubstituted C7 to C30 arylalkyl group; a substituted or unsubstituted C3 to C30 heteroaryl group; a substituted or unsubstituted C3 to C30 heteroarylalkyl group; a substituted or unsubstituted C3 to C30 cycloalkyl group; a substituted or unsubstituted C3 to C30 heterocycloalkyl group; a C1 to C10 alkoxy group; a hydroxy group; —NH$_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein non-adjacent methylene (—CH$_2$—) of the substituted C1 to C30 alkylene group may be replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 alkyl group), or a combination thereof, $Y_1$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, m is an integer of 1 or more, k1 is an integer of 1 or more and k2 is an integer of 1 or more, wherein the sum of m and k2 is an integer of 3 or more, provided that m does not exceed the valence of $Y_1$, and provided that the sum of k1 and k2 does not exceed the valence of $L_1$.

In the monomer combination, the second monomer may be represented by Chemical Formula 2.

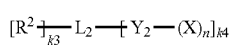

Chemical Formula 2

In Chemical Formula 2,

X is an aliphatic organic group having a carbon-carbon double bond or a carbon-carbon triple bond, an aromatic organic group having a carbon-carbon double bond or a carbon-carbon triple bond, or an alicyclic organic group having a carbon-carbon double bond or a carbon-carbon triple bond, $R^2$ is hydrogen; a substituted or unsubstituted C1 to C30 linear or branched alkyl group; a substituted or unsubstituted C6 to C30 aryl group; a substituted or unsubstituted C7 to C30 arylalkyl group; a substituted or unsubstituted C3 to C30 heteroaryl group; a substituted or unsubstituted C3 to C30 heteroarylalkyl group; a substituted or unsubstituted C3 to C30 cycloalkyl group; a substituted or unsubstituted C3 to C30 heterocycloalkyl group; a C1 to C10 alkoxy group; a hydroxy group; NH$_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group), $L_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group, $Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, n is an integer of 1 or more, k3 is an integer of 0 or more, k4 is an integer of 1 or more, wherein the sum of n and k4 is an integer of 3 or more, provided that n does not exceed the valence of $Y_2$, and provided that the sum of k3 and k4 does not exceed the valence of $L_2$.

The first monomer of the Chemical Formula 1 may include a monomer represented by Chemical Formula 1-1.

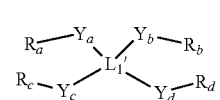

Chemical Formula 1-1

In Chemical Formula 1-1, $L_1'$ is carbon, a substituted or unsubstituted C6 to C30 arene-derived group (e.g., tetravalent arene-derived group); a substituted or unsubstituted C3 to C30 heteroarene-derived group (e.g., tetravalent heteroarene-derived group); a substituted or unsubstituted C3 to C30 cycloalkane-derived group (e.g., tetravalent cycloalkane-derived); or a substituted or unsubstituted C3 to C30 heterocycloalkane-derived group (e.g., tetravalent heterocycloalkane-derived group), $Y_a$ to $Y_d$ are each independently a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R_a$ to $R_d$ are $R^1$ of Chemical Formula 1 or SH, provided that at least two of $R_a$ to $R_d$ are SH.

The first monomer of Chemical Formula 1 may be trimethylolpropane tris(3-mercaptopropionate) of the following Chemical Formula 1-2, pentaerythritol tetrakis(3-mercaptopropionate) of the following Chemical Formula 1-3, pentaerythritol tetrakis(2-mercaptoacetate) of the following Chemical Formula 1-4, tris[2-(3-mercaptopropinonyloxy)alkyl]isocyanurate of the following Chemical Formula 1-5, a compound of the following Chemical Formula 1-6, a compound of the following Chemical Formula 1-7, a compound of the following Chemical Formula 1-8, or a mixture thereof.

[Chemical Formula 1-2]

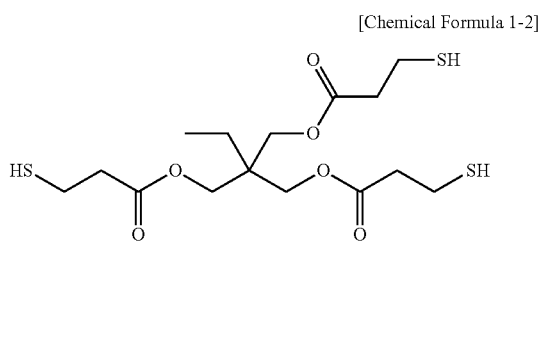

Chemical Formula 1-3

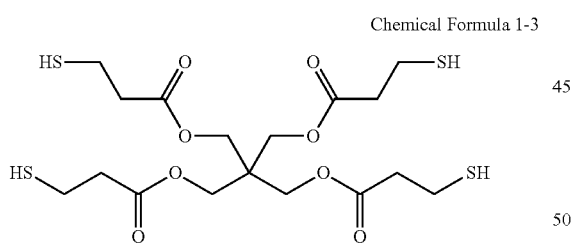

Chemical Formula 1-4

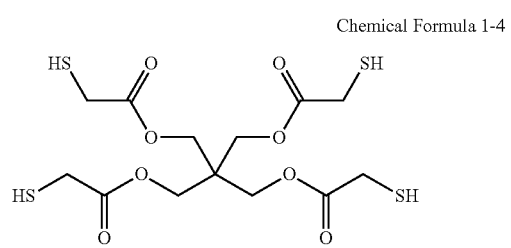

Chemical Formula 1-5

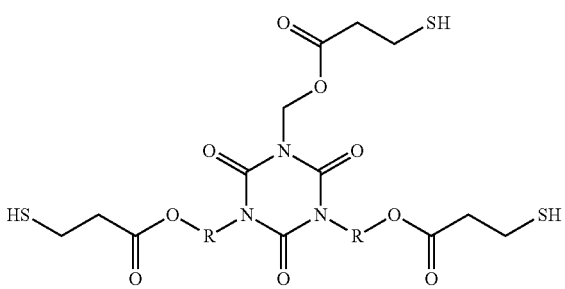

In Chemical Formula 1-5,

R is a substituted or unsubstituted C1 to C10 alkylene;

Chemical Formula 1-6

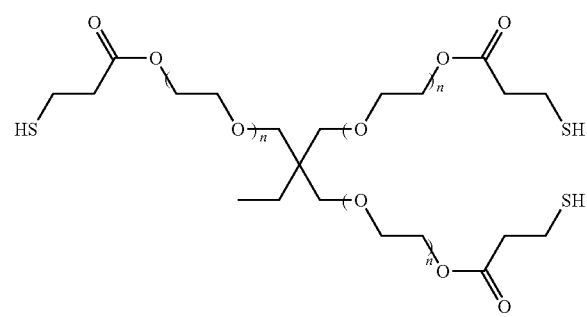

wherein n is an integer of 1 to 20,

Chemical Formula 1-7

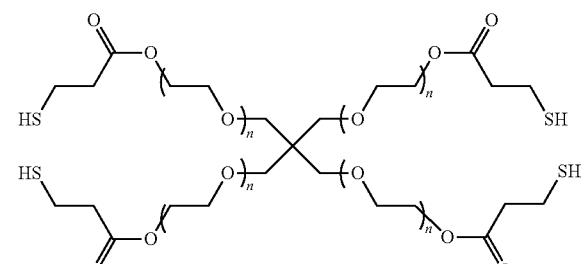

wherein n is an integer of 1 to 20, and

Chemical Formula 1-8

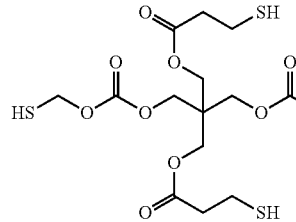 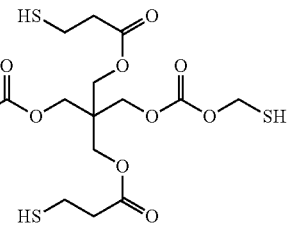

wherein n is an integer of 1 to 20.

In Chemical Formula 2,

X may be an acrylate group; a methacrylate group; a C2 to C30 alkenyl group; a C2 to C30 alkynyl group; a substituted or unsubstituted C3 to C30 alicyclic organic group including a carbon-carbon double bond or a carbon-carbon triple bond in a ring; a substituted or unsubstituted C3 to C30 heterocycloalkyl group including a carbon-carbon double bond or a carbon-carbon triple bond in a ring; a C3 to C30 alicyclic organic group substituted with a C2 to C30 alkenyl group or a C2 to C30 alkynyl group; or a C3 to C30 heterocycloalkyl group substituted with a C2 to C30 alkenyl group or a C2 to C30 alkynyl group.

The substituted or unsubstituted C3 to C30 alicyclic organic group including a carbon-carbon double bond or a carbon-carbon triple bond in a ring may be a norbornene group, a maleimide group, a nadimide group, a tetrahydrophthalimide group, or a combination thereof.

The second monomer may be a C4 to C100 diallyl compound, a C4 to C100 triallyl compound, a C4 to C100 diallyl ether compound, a C4 to C100 triallyl ether compound, a C4 to C100 di(meth)acrylate compound, a C4 to C100 tri(meth)acrylate compound, a divinyl ether compound, or a combination thereof.

In Chemical Formula 2, $L^2$ may be a group including a pyrrolidine residual group, a tetrahydrofuran residual group, a pyridine residual group, a pyrimidine residual group, a piperidine residual group, a triazine residual group, or an isocyanurate residual group.

The second monomer of the Chemical Formula 2 may be a compound represented by Chemical Formula 2-1, Chemical Formula 2-2, or Chemical Formula 2-3.

Chemical Formula 2-1

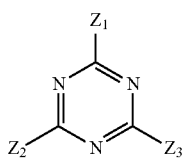

Chemical Formula 2-2

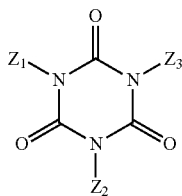

In Chemical Formulae 2-1 and 2-2, $Z_1$ to $Z_3$ are each independently *—$Y_2$—$X_n$ as defined for the Chemical Formula 2;

Chemical Formula 2-3

$$\begin{array}{c} R'_a\!-\!Y_a \quad\quad Y_b\!-\!R'_b \\ \diagdown \quad \diagup \\ L_2' \\ \diagup \quad \diagdown \\ R'_c\!-\!Y_c \quad\quad Y_d\!-\!R'_d \end{array}$$

in Chemical Formula 2-3, $L_2'$ is carbon; a substituted or unsubstituted C1 to C30 alkane-derived group (e.g., tetravalent alkane-derived group); a substituted or unsubstituted C2 to C30 alkene-derived group (e.g., tetravalent alkene-derived group); a C1 to C30 alkane-derived group (e.g., tetravalent alkane-derived group) wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), C6 to C10 cycloalkylene group, or a combination thereof; a C2 to C30 alkene-derived group (e.g., tetravalent alkene-derived group) wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), C6 to C10 cycloalkylene group, or a combination thereof; a substituted or unsubstituted C6 to C30 arene-derived group (e.g., tetravalent arene-derived group); a substituted or unsubstituted C3 to C30 heteroarylene-derived group (e.g., tetravalent heteroarylene-derived group); a substituted or unsubstituted C3 to C30 cycloalkane-derived group (e.g., tetravalent cycloalkane-derived group); or a substituted or unsubstituted C3 to C30 heterocycloalkane-derived group (e.g., tetravalent heterocycloalkane-derived group), each of $Y_a$ to $Y_d$ are each independently a single bond; a substituted or unsubstituted C1 to C30 alkylene group; a substituted or unsubstituted C2 to C30 alkenylene group; or a C1 to C30 alkylene group or C2 to C30 alkenylene group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R'_a$ to $R'_d$ of Chemical Formula 2 are $R^2$ or X of Chemical Formula 2, provided that at least two of $R'_a$ to $R'_d$ are X of Chemical Formula 2.

The second monomer may include a compound of the following Chemical Formula 2-4, a compound of the following Chemical Formula 2-5, a compound of the following Chemical Formula 2-6, a compound of the following Chemical Formula 2-7, a compound of the following Chemical Formula 2-8, a compound of the following Chemical Formula 2-9, a compound of the following Chemical Formula 2-10, a compound of the following Chemical Formula 2-11, a compound of the following Chemical Formula 2-12, a compound of the following Chemical Formula 2-13, a compound of the following Chemical Formula 2-14, a compound of the following Chemical Formula 2-15, or a mixture thereof.

Chemical Formula 2-4

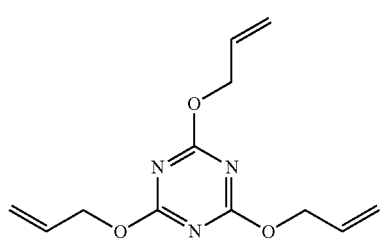

Chemical Formula 2-5

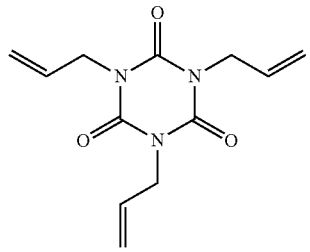

Chemical Formula 2-6

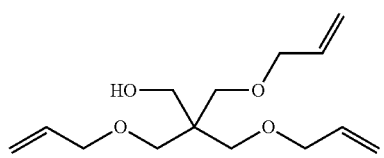

Chemical Formula 2-7

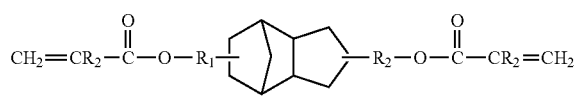

In Chemical Formula 2-7,
$R_1$ is a C1 to C20 alkylene group, or a C1 to C20 alkylene group wherein at least one methylene (—$CH_2$—) is replaced by sulfonyl (—$S(=O)_2$—), carbonyl (—$C(=O)$—), ether (—O—), sulfide (—S—), sulfoxide (—$S(=O)$—), ester (—$C(=O)O$—), amide (—$C(=O)NR$—) (wherein R is hydrogen or a C1 to C10 linear or branched alkyl group), imine (—$C(=NR)$—) (wherein R is hydrogen or a C1 to C10 linear or branched alkyl group), or a combination thereof, and $R_2$ is hydrogen or a methyl group;

Chemical Formula 2-8

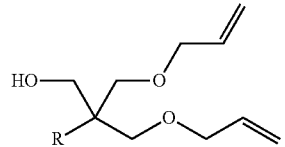

wherein in Chemical Formula 2-8,
R is a C1 to C10 alkyl group;

Chemical Formula 2-9

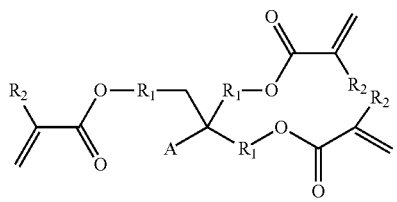

wherein in Chemical Formula 2-9,
A is a C1 to C10 alkyl group or a hydroxy group,
$R_1$ is a single bond, a C1 to C20 alkylene group, and a C1 to C20 alkylene wherein at least one methylene (—$CH_2$—) is replaced by sulfonyl (—$S(=O)_2$—), carbonyl (—$C(=O)$—), ether (—O—), sulfide (—S—), sulfoxide (—$S(=O)$—), ester (—$C(=O)O$—), amide (—$C(=O)NR$—) (wherein R is hydrogen or a C1 to C10 linear or branched alkyl group), imine (—$C(=NR)$—) (wherein R is hydrogen or a C1 to C10 linear or branched alkyl group), or a combination thereof, and
$R_2$ is hydrogen or a methyl group;

Chemical Formula 2-10

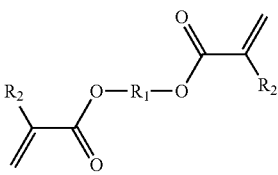

wherein in Chemical Formula 2-10,
$R_1$ is a single bond, a C1 to C20 alkylene, or C1 to C20 alkylene wherein at least one methylene (—$CH_2$—) is replaced by sulfonyl (—$S(=O)_2$—), carbonyl (—$C(=O)$—), ether (—O—), sulfide (—S—), sulfoxide (—$S(=O)$—), ester (—$C(=O)O$—), amide (—$C(=O)NR$—) (wherein R is hydrogen or a C1 to C10 linear or branched alkyl group), imine (—$C(=NR)$—) (wherein R is hydrogen or a C1 to C10 linear or branched alkyl group), or a combination thereof, and
$R_2$ is hydrogen or a methyl group;

Chemical Formula 2-11

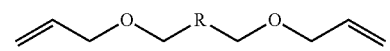

wherein in Chemical Formula 2-11,
R is a single bond, a C1 to C20 alkylene, or C1 to C20 alkylene wherein at least one methylene (—$CH_2$—) is replaced by sulfonyl (—S(=O)₂—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, Chemical Formula 2-12

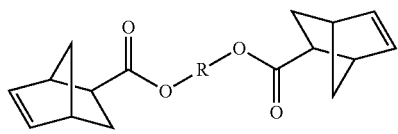

wherein in Chemical Formula 2-12,

R is a C1 to C20 alkylene, or a C1 to C20 alkylene wherein at least one methylene (—CH₂—) is replaced by sulfonyl (—S(=O)₂—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, Chemical Formula 2-13

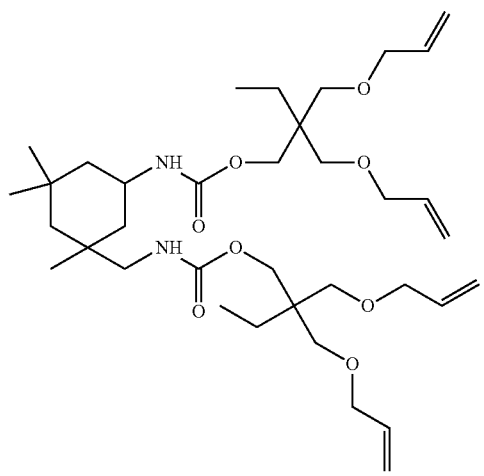

Chemical Formula 2-14

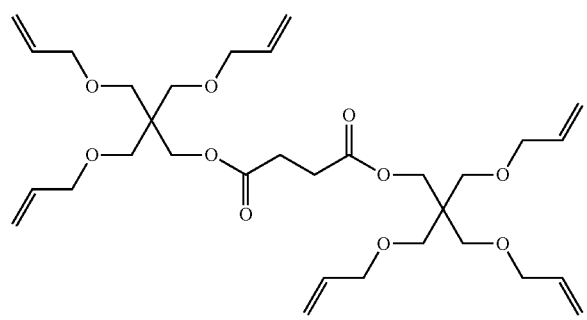

Chemical Formula 2-15

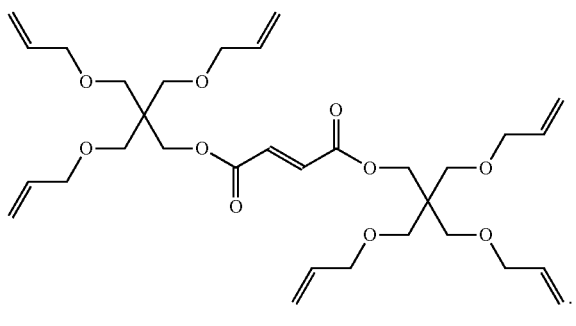

The monomer combination may further include a third monomer having one thiol group located at a terminal end of the third monomer or a fourth monomer having one unsaturated carbon-carbon bond located at a terminal end of the fourth monomer, or both of them.

In the monomer combination, the first monomer and the second monomer may be present in such amounts that a mole ratio of the thiol group of the first monomer to the carbon-carbon unsaturated bond of the second monomer may be 1:about 0.1 to about 10, for example, 1:about 0.2 to about 1:5, 1:about 0.75 to about 1:3, 1:about 1.1 to about 2, or 1:about 1.5 to about 1.8.

In another embodiment, a clay-polymer composite for a barrier coating includes a cross-linked polymerization product of a first monomer having at least two thiol groups at its terminal end and a second monomer having at least two carbon-carbon unsaturated bond-containing groups at its terminal end; and a plurality of organo-modified clay particles dispersed in the cross-linked polymerization product, wherein the organo-modified clay particles include a compound having a hydrocarbyl group linked to a heteroatom, and wherein the compound is a primary, secondary, or tertiary amine, a quaternary organoammonium salt, a primary, secondary, or tertiary phosphine, a quaternary organophosphonium salt, a thiol including an amine group, or a combination thereof.

The clay particle may be included in an amount of about 0.1 to about 20 wt % based on the total weight of the clay-polymer composite.

The clay-polymer composite may have transmittance of greater than or equal to about 85% for visible light.

The clay composite may have an oxygen transmission rate of less than or equal to about 5 cubic centimeters per square meter per day per atmosphere as measured at 23° C. under relative humidity of about 0% according to JIS K7126-2 or ASTM D 3985, for example, by using Oxytran (Mocon Inc.).

The clay composite may have a water transmission rate of less than or equal to about 5 grams per square meter per day, as measured at 37° C. under relative humidity of about 100% according to JIS K7129B, for example, by using Aquatran (Mocon Inc.) and the like.

The clay particle may include smectite clay, mica clay, vermiculite clay, montmorillonite clay, iron-containing montmorillonite clay, beidellite clay, saponite clay, hectorite clay, stibensite clay, nontronite clay, anionic clay, zirconium phosphate, kaolinite, atapulgite, illite, halloysite, diatomaceous earth, fuller's earth, calcined aluminum silicate, hydrated aluminum silicate, magnesium aluminum silicate, sodium silicate, magnesium silicate, or a combination thereof.

The compound may include a primary, secondary, or tertiary amine compound having at least one substituted or unsubstituted C6 to C20 hydrocarbyl group linked to a nitrogen atom, a quaternary organoammonium salt compound having at least one substituted or unsubstituted C6 to C20 hydrocarbyl group linked to a nitrogen atom, a primary, secondary, or tertiary phosphine compound having at least one substituted or unsubstituted C6 to C20 hydrocarbyl group linked to a phosphorus atom, an organophosphonium salt compound having at least one substituted or unsubstituted C6 to C20 hydrocarbyl group linked to a phosphorus atom, and a C6 or greater thiol compound having an amine group ($H_2N$—), or a combination thereof.

The compound may include hexylamine (i.e., n-hexylamine), a dioctadecyldimethylammonium salt, a methyltrioctylammonium salt, a hexyltriphenylphosphonium salt, a tributylmethylphosphonium, a triethylpentylphosphonium salt, an 8-amino-1-octanethiol, a triethyloctylphosphonium salt, a tetraphenylphosphonium salt, or a combination thereof.

The clay particles may have a longest average diameter of about 50 nanometers to about 10 micrometers, and an average thickness of about 1 nanometer to about 10 nanometers.

In the clay-polymer composite, descriptions of the first monomer and the second monomer are the same as set forth above.

In another embodiment, a quantum dot-polymer composite article includes:

a quantum dot-polymer composite including a polymer host matrix, and a plurality of quantum dots dispersed in the polymer host matrix; and a barrier coating disposed on at least a portion of the surface of the quantum dot polymer composite, wherein the barrier coating includes a cross-linked polymerization product of a first monomer having at least two thiol groups at its terminal end and a second monomer having at least two carbon-carbon unsaturated bond-containing groups at its terminal end, and a plurality of organo-modified clay particles dispersed in the cross-linked polymerization product, wherein the organo-modified clay particles include a compound having a hydrocarbyl group linked to a heteroatom, and wherein the compound is a primary, secondary, or tertiary amine, a quaternary organoammonium salt, a primary, secondary, or tertiary phosphine, a quaternary phosphonium salt, a thiol including an amine group, or a combination thereof.

The quantum dot may include a Group II-VI compound, a Group III-V compound, a Group IV-VI compound, a Group IV compound, or a combination thereof.

The quantum dot may include a semiconductor nanocrystal particle having a core-shell structure.

The quantum dot-polymer composite may further include one or more light emitting particles a metal nanocrystal, a metal oxide nanocrystal, a phosphor, a pigment, or a combination thereof.

The polymer host matrix may include a cross-linked polymerization product (that is, a thiol-ene polymer) of a first monomer having at least two thiol groups at its terminal end and a second monomer having at least two carbon-carbon unsaturated bond-containing groups at its terminal end, cross-linked or non-cross-linked poly(meth)acrylate, an epoxy polymer, an epoxy(meth)acrylate polymer, a silicone polymer, a silicon(meth)acrylate polymer, a polyurethane (meth)acrylate polymer, a vinyl polymer, a silicone polymer, or a combination thereof.

The quantum dot-polymer composite may have any shape or size, but are generally spherical, ellipsoidal, polyhedral, rod-shaped, or irregular in shape. For example, the quantum dot-polymer composite may have a sheet shape, a bar shape, a pipe shape, or a tube shape.

The clay particle may include smectite clay, mica clay, vermiculite clay, montmorillonite clay, iron-containing montmorillonite clay, beidellite clay, saponite clay, hectorite clay, stibensite clay, nontronite clay, anionic clay, zirconium phosphate, kaolinite, atapulgite, illite, halloysite, diatomaceous earth, fuller's earth, calcined aluminum silicate, hydrated aluminum silicate, magnesium aluminum silicate, sodium silicate, and magnesium silicate, or a combination thereof.

In an embodiment, the clay may be smectite clay.

The compound may include a primary, secondary, or tertiary amine compound having at least one substituted or unsubstituted C6 to C20 hydrocarbyl group linked to a nitrogen atom, a quaternary organoammonium salt compound having at least one substituted or unsubstituted C6 to C20 hydrocarbyl group linked to a nitrogen atom, a primary, secondary, or tertiary phosphine compound having at least one substituted or unsubstituted C6 to C20 hydrocarbyl group linked to a phosphorus atom, an organophosphonium salt compound having at least one substituted or unsubstituted C6 to C20 hydrocarbyl group linked to a phosphorus atom, and a C6 or greater thiol compound including an amine group ($H_2N$—), or a combination thereof.

The compound may include hexylamine, a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, a triethyloctylphosphonium salt, a tetraphenylphosphonium salt, or a combination thereof.

The clay particles may have a longest average diameter of about 50 nanometers to about 10 micrometers, and an average thickness of about 1 nanometer to about 10 nanometers.

In the quantum dot-polymer composite article, details of the first monomer and the second monomer are the same as set forth above. In another embodiment, an electronic device includes the quantum dot-polymer composite article.

The electronic device may be a display, a light emitting device, a memory device, a laser device, or a solar cell.

The light emitting device includes a light source and the article positioned on the light source in such a way that light emitted from the light source transmits through the article.

According to some embodiments, the barrier coating composition and a barrier coating (e.g., a barrier film) including a clay-polymer composite prepared therefrom may be applied onto a quantum dot-polymer composite to replace a conventional barrier film based on a metal oxide and to provide long term reliability comparable thereto.

The barrier coating of some embodiments may have interfacial affinity with the quantum dot polymer composites and thus may encapsulate a photoconversion layer including quantum dots that is included in an LED or a QD sheet without additional surface treatment.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
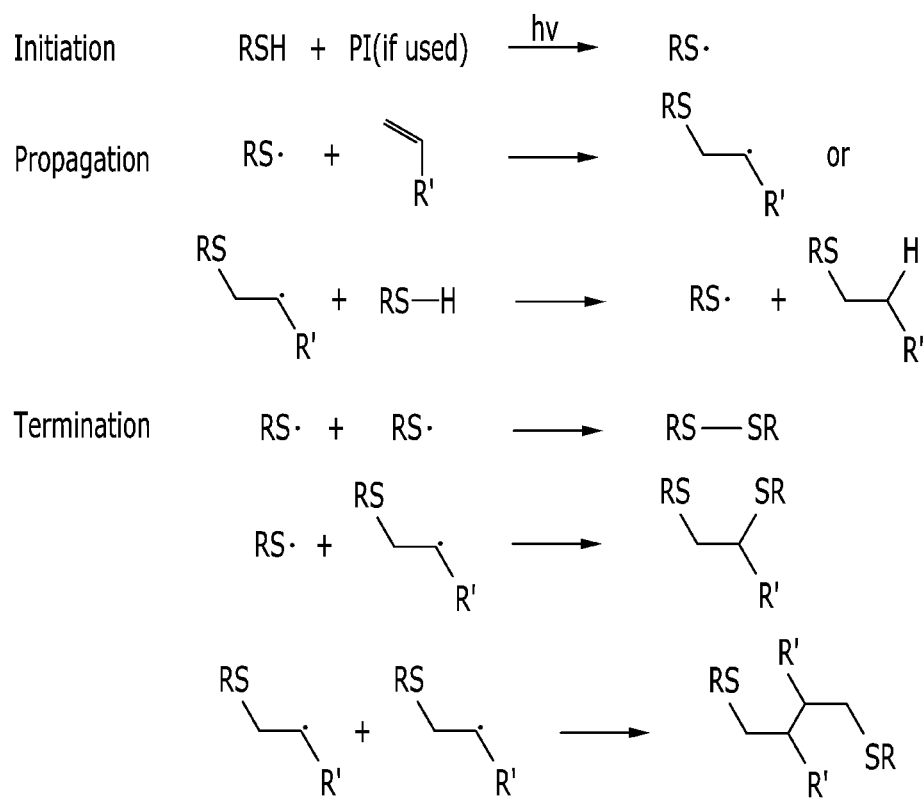
FIG. 1 is a scheme showing a thiol-ene polymerization mechanism between a first monomer and a second monomer.

This disclosure will be described more fully hereinafter in the following detailed description, in which some but not all embodiments of this disclosure are described. This disclosure may be embodied in many different forms and is not to be construed as limited to the embodiments set forth herein; rather, these embodiments are provided so that this disclosure will fully convey the scope of the instant disclosure to those skilled in the art. Thus, in some exemplary embodiments, well-known technologies are not specifically explained to avoid ambiguous understanding of the present inventive concept. Thus, in some exemplary embodiments, well known technologies are not specifically explained to avoid ambiguous understanding of the present inventive concept. Accordingly, the exemplary embodiments are merely described below, by referring to the figures, to explain aspects of the present inventive concept. Expressions such as "at least one of," when preceding a list of elements, modify the entire list of elements and do not modify the individual elements of the list. Unless otherwise defined, all terms used in the specification (including technical and scientific terms) may be used with meanings commonly understood by a person having ordinary knowledge in the art to which this invention belongs. Further, unless explicitly defined to the contrary, the terms defined in a generally-used dictionary should be interpreted as having a meaning that is consistent with their meaning in the context of the relevant art and the present disclosure, and are not ideally or excessively interpreted. In addition, unless explicitly described to the contrary, the word "comprise" and variations such as "comprises" or "comprising", and the word "include" and variations such as "includes" or "including", when used in this specification, specify the presence of stated features, regions, integers, steps, operations, elements, and/or components, but do not preclude the presence or addition of one or more other features, regions, integers, steps, operations, elements, components, and/or groups thereof. Therefore, the above words will be understood to imply the inclusion of stated elements but not the exclusion of any other elements.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As stated above, unless specifically described to the contrary, a singular form includes a plural form.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

As used herein, when a definition is not otherwise provided, the term "substituted" refers to a compound or group wherein at least one of hydrogen atoms thereof is substituted with a substituent a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group (—NRR' wherein R and R' are independently hydrogen or a C1 to C6 alkyl group), an azido group (—N$_3$), an amidino group (—C(═NH)NH$_2$), a hydrazino group (—NHNH$_2$), a hydrazono group (═N(NH$_2$), an aldehyde group (—C(═O)H), a carbamoyl group (—C(O)NH$_2$), a thiol group (—SH), ester group (—C(═O)OR, wherein R is a C1 to C6 alkyl group or a C6 to C12 aryl group), a carboxyl group (—COOH) or a salt thereof (—C(═O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof.

As used herein, the term "monovalent organic functional group" refers to a C1 to C30 alkyl group, a C2 to C30 alkynyl group, a C6 to C30 aryl group, a C7 to C30 alkylaryl group, a C1 to C30 alkoxy group, a C1 to C30 heteroalkyl group, a C3 to C30 heteroalkylaryl group, a C3 to C30 cycloalkyl group, a C3 to C15 cycloalkenyl group, a C6 to C30 cycloalkynyl group, or a C2 to C30 heterocycloalkyl group.

As used herein, the term "hetero" refers to a moiety including one to three heteroatoms (N, O, S, Si, P, or a combination thereof).

As used herein, the term "alkyl group" refers to a group derived from a straight or branched chain saturated aliphatic hydrocarbon having the specified number of carbon atoms and having a valence of at least one.

As used herein, the term "alkoxy group" refers to "alkyl-O—", wherein the term "alkyl" has the same meaning as described above.

As used herein, the term "alkenyl group" refers to a straight or branched chain, monovalent hydrocarbon group having at least one carbon-carbon double bond.

As used herein, the term "alkynyl group" refers to a straight or branched chain, monovalent hydrocarbon group having at least one carbon-carbon triple bond.

As used herein, the term "cycloalkyl group" refers to a monovalent group having one or more saturated rings in which all ring members are carbon.

As used herein, the term "aryl", which is used alone or in combination, refers to an aromatic hydrocarbon containing at least one ring and having the specified number of carbon atoms. The term "aryl" may be construed as including a group with an aromatic ring fused to at least one cycloalkyl ring.

As used herein, the term "heteroaryl group" refers to an aryl group including carbon and 1 to 3 heteroatoms (N, O, S, P or a combination thereof) as ring atoms.

As used herein, the term "arylalkyl group" refers to a substituted or unsubstituted aryl group covalently linked to an alkyl group that is linked to a compound.

As used herein, the term "heteroarylalkyl group" refers to a substituted or unsubstituted heteroaryl group covalently linked to an alkyl group that is linked to a compound.

As used herein, the term "alkylene group" refers to a linear or branched saturated aliphatic hydrocarbon group having a valence of at least two, optionally substituted with one or more substituents.

As used herein, the term "alkenylene group" refers to a straight or branched aliphatic hydrocarbon group having a valence of at least two, having at least one carbon-carbon double bond, optionally substituted with one or more substituents where indicated, provided that the valence of the alkylene group is not exceeded.

As used herein, the term "cycloalkylene group" refers to a cyclic hydrocarbon group having a valence of at least two, optionally substituted with one or more substituents where indicated, provided that the valence of the cycloalkylene group is not exceeded.

As used herein, the term "arylene group" refers to a functional group having a valence of at least two obtained by removal of two hydrogens in an aromatic ring, optionally substituted with one or more substituents.

As used herein, the term "heteroarylene group" refers to a functional group having a valence of at least two obtained by removal of two hydrogens in an aromatic ring, containing one to three heteroatoms (N, O, S, Si, P, or a combination thereof) as ring-forming elements, optionally substituted with one or more substituents where indicated, provided that the valence of the alkylene group is not exceeded.

As used herein, the term "aliphatic organic group" refers to a C1 to C30 linear or branched alkyl group, the term "aromatic organic group" refers to a C6 to C30 aryl group or a C2 to C30 heteroaryl group, and the term "alicyclic organic group" refers to a C3 to C30 cycloalkyl group, a C3 to C30 cycloalkenyl group, or a C3 to C30 cycloalkynyl group. The term "carbon-carbon unsaturated bond-containing substituent" refers to a C2 to C20 alkenyl group including at least one carbon-carbon double bond, a C2 to C20 alkynyl group including at least one carbon-carbon triple bond, a C6 to C18 cycloalkenyl group including at least one carbon-carbon double bond in a ring, or a C6 to C18 cycloalkynyl group including at least one carbon-carbon triple bond in a ring.

As used herein, the term "(meth)acrylate" refers to acrylate and/or methacrylate.

As used herein, the term "hydrocarbyl group" refers to a monovalent group (e.g., alkyl group, an alkenyl group, an alkynyl group, or an aryl group) that is formed by removal of a hydrogen atom from a hydrocarbon such as alkane, alkene, or alkyne, and in which at least one remaining hydrogen atom may be substituted with a group as set forth above. In the hydrocarbyl group, at least one methylene (—CH$_2$—) moiety may be replaced by an oxide (—O—) residual group.

As used herein, the term "visible light" refers to light in a wavelength of about 390 nanometers (nm) to about 700 nm.

As used herein, the term "quaternary organoammonium salt" refers to a salt including a cation of NR$_4^+$ (wherein each R is independently hydrogen, an alkyl group or an aryl group, wherein two or more groups R may be linked to each other, or may not be linked to each other, provided that at least one R is not hydrogen), and an anion (e.g., halide, sulfate, phosphate, nitrate, or the like). In some embodiments, the quaternary organoammonium salt may be a quaternary ammonium salt having four hydrocarbyl groups (e.g., each independently selected from an alkyl group, an aryl group, and a combination thereof).

As used herein, the term "quaternary organophosphonium salt" refers to a salt including a cation of PR$_4^+$ (wherein each R is independently hydrogen, an alkyl group or an aryl group, wherein two or more groups R may be linked to each other, or may not be linked to each other, provided that at least one R is not hydrogen), and an anion (e.g., halide, sulfate, phosphate, nitrate, or the like).

In an embodiment composition, a barrier coating composition includes:

a monomer composition (which can be a mixture of two or more compounds) including a first monomer having at least two thiol (—SH) groups at its terminal end and a second monomer having at least two carbon-carbon unsaturated bond-containing groups at its terminal end; and a plurality of organo-modified clay particles dispersed in the monomer combination.

As used herein, the term "organo-modified" refers to treatment of a raw material of clay with an organic compound to provide the clay having the organic compound. The raw material of clay may be a synthetic clay. The organo-modified clay particles may include, for example, particles of a compound having a hydrocarbyl group linked to a heteroatom, specifically nitrogen (N), sulfur (S), or phosphorus (P) on the surface. The compound may be a primary, secondary, or tertiary amine, a quaternary organoammonium salt, a primary, secondary, or tertiary phosphine, a quaternary organophosphonium salt, a thiol including an amine group, or a combination thereof.

The barrier coating composition may not include water or a solvent miscible with water. Herein, examples of the solvent miscible with water may include C1 to C3 alcohols (e.g., methanol, ethanol, propanol, and the like) and ketones (e.g., acetone). The barrier coating composition may include an organic solvent in an amount of less than about 10 percent by weight (wt %), for example, less than or equal to about 10 wt %, less than or equal to about 9 wt %, less than or equal to about 8 wt %, less than or equal to about 7 wt %, less than or equal to about 6 wt %, less than or equal to about 5 wt %, less than or equal to about 4 wt %, or less than or equal to about 3 wt % based on the total weight of the composition. Specific examples of the organic solvent that may be included in the composition may include chloroform, hexene, acetone, ethanol, or a combination thereof. In some embodiments, the composition may not include the organic solvent.

The clay particle dispersed in the combination of the first monomer and the second monomer may be included in an amount of greater than or equal to about 0.1 parts by weight, for example, greater than or equal to about 0.5 parts by weight, greater than or equal to about 1 part by weight, greater than or equal to about 2 parts by weight, or greater than or equal to about 3 parts by weight based on 100 parts by weight of the monomer combination. The clay particle may be included in an amount of less than or equal to about 20 parts by weight, for example, in an amount of less than or equal to about 19 parts by weight, less than or equal to about 18 parts by weight, less than or equal to about 17 parts by weight, less than or equal to about 16 parts by weight, less than or equal to about 15 parts by weight, less than or equal to about 14 parts by weight, less than or equal to about 13 parts by weight, less than or equal to about 12 parts by weight, or less than or equal to about 10 parts by weight based on 100 parts by weight of the monomer combination. While not wishing to be bound by a theory, it is understood that when the clay particle is included within the above ranges, transmission rate of oxygen and moisture may be lowered and light transmittance of the prepared composition may be increased.

The clay particle may include smectite clay, mica clay, vermiculite clay, montmorillonite clay, iron-containing montmorillonite clay, beidellite clay, saponite clay, hectorite clay, stibensite clay, nontronite clay, anionic clay (e.g., layered double hydroxide or hydrotalcite), zirconium phosphate, kaolinite, atapulgite, illite, halloysite, diatomaceous earth, fuller's earth, calcined aluminum silicate, hydrated aluminum silicate, magnesium aluminum silicate, sodium silicate, and magnesium silicate, or a combination thereof. In an embodiment, the clay particle may be smectite clay. The clay particle may be a sheet-shaped particle having a nano-sized thickness. The clay particle may have an aspect ratio ranging from about 20 to about 10,000 in an exfoliated form. Herein, the aspect ratio indicates a ratio of a longest diameter of the clay particle (a single clay sheet) relative to a thickness thereof. In an embodiment, the clay particle may have the longest average diameter of about 50 nanometers (nm) to about 10 micrometers (um), for example, about 50 nm to about 1 um, and an average thickness of about 1 nm to about 10 nm. The clay particle may have a layered structure including at least one sheet.

The clay particle includes the compound including a hydrocarbyl group linked to a heteroatom and thus may be a lipophilic (or hydrophobic) clay particle. This clay particle may be dispersed in a post-described monomer combination or a cross-linked polymer manufactured therefrom without remarkable phase-separation or aggregation. This clay particle may be dispersed in a post-described monomer combination or a cross-linked polymer manufactured therefrom without remarkable interlayer exfoliation. As a result, a barrier coating composition including the clay particle or a clay-polymer composite prepared therefrom may show high transmittance with regard to visible light. For example, the barrier coating composition including the clay particle (and the clay-polymer composite prepared therefrom) may have light transmittance of greater than or equal to about 85%, for example, greater than or equal to about 90% for visible light.

This clay particle may be obtained by exchanging cations (e.g., an organoammonium cation, an organophosphonium cation, and the like) present among hydrophilic clay particle layers, with cations included in the above compound. This clay particle may be basically obtained by attaching the above compound on the surface of a hydrophilic clay particle.

The compound may include a primary, secondary, or tertiary amine compound including one or more (e.g., 1, 2, or 3) of a substituted or unsubstituted C6 to C20 hydrocarbyl group (e.g., a substituted or unsubstituted C6 to C16 alkyl group, a substituted or unsubstituted C6 to C16 alkenyl group, or a combination thereof), a quaternary organoammonium salt compound including one or more (e.g., 1, 2, or 3) of a substituted or unsubstituted C6 to C20 hydrocarbyl group (e.g., a substituted or unsubstituted C6 to C16 alkyl group, a substituted or unsubstituted C6 to C16 alkenyl group, or a combination thereof), a primary, secondary, or tertiary phosphine compound including one or more (e.g., 1, 2, or 3) of a substituted or unsubstituted C6 to C20 hydrocarbyl group (e.g., a substituted or unsubstituted C6 to C16 alkyl group, a substituted or unsubstituted C6 to C16 alkenyl group, or a combination thereof), a quaternary organophosphonium salt compound including one or more (e.g., 1, 2, or 3) of a substituted or unsubstituted C6 to C20 hydrocarbyl group (e.g., a substituted or unsubstituted C6 to C18 (e.g., C6 to C16) alkyl group, a substituted or unsubstituted C6 to C16 alkenyl group, or a combination thereof), and a C6 or greater (e.g., C6 to C20) thiol compound including an amino group, or a combination thereof.

The compound may include hexylamine, a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, a trioctylphosphonium salt, tetraphenylphosphonium, a dioctadecyldimethylammonium salt, a methyltrioctylammonium salt, a hexyltriphenylphosphonium salt, a triethylpentylphosphonium salt, 8-amino-1-octanethiol, or a combination thereof.

The organo-modified clay particles may be commercially available or may be manufactured by using a well-known method. For example, the organo-modified clay particles may be obtained by dispersing clay intrinsically having a hydrophilic surface in a predetermined amount of water, adding the aforementioned organic compound thereto, and then agitating the same for a predetermined time and filtering it.

The organo-modified clay particles may be dispersed in a monomer combination (which can be a mixture of two or more compounds) (hereinafter referred to as a thiol-ene system) including a first monomer having at least two thiol (—SH) groups at its terminal end and a second monomer having at least two carbon-carbon unsaturated bond-containing groups at its terminal end, or a cross-linked polymer formed therefrom without having a negative influence on light transmittance of a final composition or a cross-linked polymer composite.

The first monomer may be represented by the following Chemical Formula 1.

Chemical Formula 1

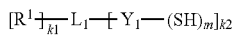

In Chemical Formula 1, definitions for $R^1$, $L_1$, $Y_1$, m, k1, and k2 are the same as set forth above.

The first monomer of the Chemical Formula 1 may include a monomer of the following Chemical Formula 1-1.

Chemical Formula 1-1

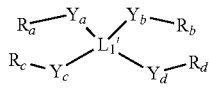

In Chemical Formula 1-1, definitions for $L_1'$, $Y_a$ to $Y_d$, and $R_a$ to $R_d$ are the same as set forth above.

For example, the first monomer of the Chemical Formula 1 may be trimethylolpropane tris(3-mercaptopropionate) of the following Chemical Formula 1-2, pentaerythritol tetrakis (3-mercaptopropionate) of the following Chemical Formula 1-3, pentaerythritol tetrakis(2-mercaptoacetate) of the following Chemical Formula 1-4, tris[2-(3-mercaptopropinonyloxy)alkyl]isocyanurate of the following Chemical Formula 1-5, pentaerythritoltetrakis(3-mercaptobutylate), trimethylolpropanetris(3-mercaptopropionate) (3T), tris[2-(3-mercaptopropinonyloxy)ethyl]isocyanurate (3TI) tris[2-(3-mercaptopropionyloxy)ethyl]isocyanurate), a compound of the following Chemical Formula 1-6, a compound of the following Chemical Formula 1-7, a compound of the following Chemical Formula 1-8, or a mixture thereof, but is not limited thereto.

Chemical Formula 1-2

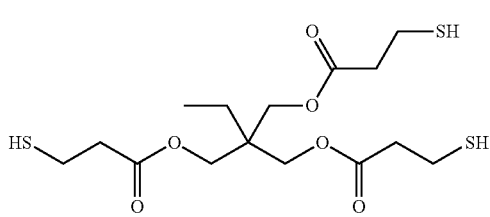

Chemical Formula 1-3

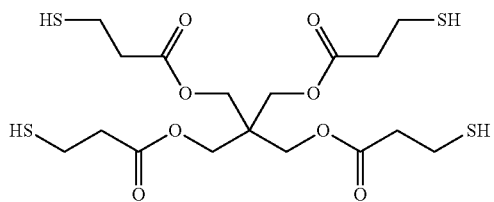

Chemical Formula 1-4

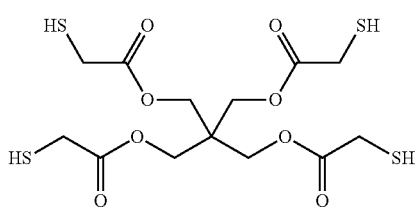

Chemical Formula 1-5

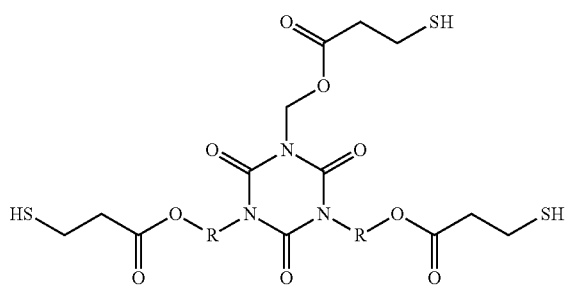

In Chemical Formula 1-5,

R is a substituted or unsubstituted C1 to C10 alkylene;

Chemical Formula 1-6

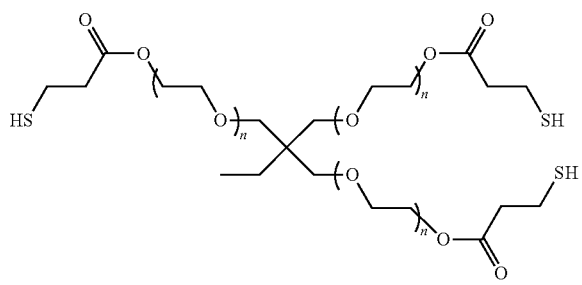

wherein n is an integer ranging from 1 to 20,

Chemcial Formula 1-7

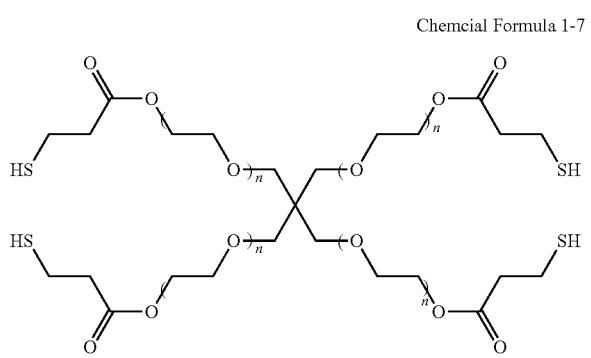

wherein n is an integer ranging from 1 to 20, and

Chemical Formula 1-8

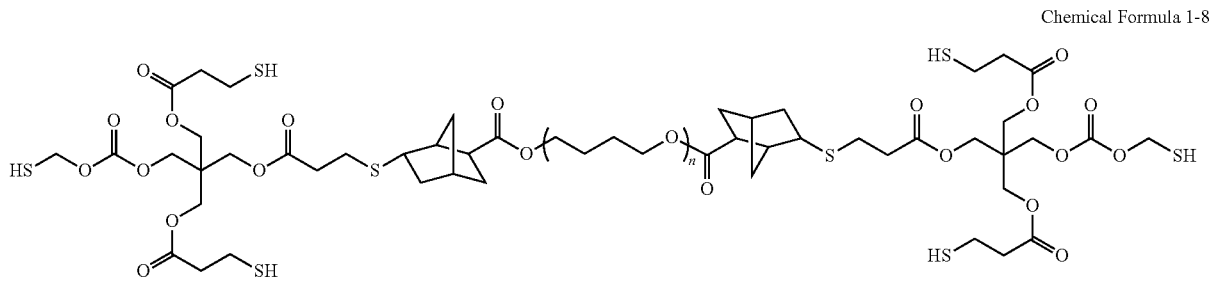

wherein n is an integer ranging from 1 to 20.

The compounds of Chemical Formula 1-2 to Chemical Formula 1-8 may be commercially available from, for example, Sartomer, or may be synthesized by a well-known method.

The second monomer may be represented by the following Chemical Formula 2.

Chemical Formula 2

In Chemical Formula 2, definitions for X, $R^2$, $L_2$, $Y_2$, n, k3, and k4 are the same as set forth above.

In an embodiment, in Chemical Formula 2,

X may be an acrylate group; a methacrylate group; a C2 to C30 alkenyl group; a C2 to C30 alkynyl group; a substituted or unsubstituted C3 to C30 alicyclic organic group including a carbon-carbon double bond or a carbon-carbon triple bond in a ring; a substituted or unsubstituted C3 to C30 heterocycloalkyl group including a carbon-carbon double bond or a carbon-carbon triple bond in a ring; a C3 to C30 alicyclic organic group substituted with a C2 to C30 alkenyl group or a C2 to C30 alkynyl group; or a C3 to C30 heterocycloalkyl group substituted with a C2 to C30 alkenyl group or a C2 to C30 alkynyl group.

In Chemical Formula 2, $L_2$ may be a linear or branched C1 to C30 alkylene residual group, a tricyclodecane residual group, a pyrrolidine residual group, a tetrahydrofuran residual group, a pyridine residual group, a pyrimidine residual group, a piperidine residual group, a triazine residual group, or an isocyanurate residual group.

The substituted or unsubstituted C3 to C30 alicyclic organic group including a carbon-carbon double bond or a carbon-carbon triple bond in a ring may be a norbornene group, a maleimide group, a nadimide group, a tetrahydrophthalimide group, or a combination thereof.

In an embodiment, the second monomer may be a C4 to C100 diallyl compound such as 1,3-butadiene or diallyl succinate, a C7 to C100 triallyl compound such as triallyl borate, 2,4,6-triallyloxy-1,3,5-triazine, or 1,3,5-triallyl-1,3,5-triazine-2,4,6(1H,3H,5H)-trione, a C6 to C100 diallyl ether compound such as diallyl ether, trimethylolpropane diallyl ether, or 2,2'-diallyl bisphenol A diacetate ether, a C10 to C100 triallyl ether compound such as 1-(allyloxy)-2,2-bis((allyloxy)methyl)butane, a C4 to C100 di(meth)acrylate compound such as ethylene glycol dimethacrylate, hexanediol diacrylate, tricyclodecane dimethanol diacrylate, a C9 to C100 tri(meth)acrylate compound such as trimethylolpropane triacrylate, or ethoxylated trimethylolpropane triacrylate, a divinyl ether compound such as triethylene glycol divinyl ether, bis[4-vinyloxy]butyl]adipate (bis[4-(vinyloxy)butyl]adipate), 1,4-butanediol divinyl ether(1,4-butanediol divinyl ether), or a combination thereof.

The second monomer of the Chemical Formula 2 may be represented by Chemical Formula 2-1, Chemical Formula 2-2, Chemical Formula 2-3, or Chemical Formula 2-4.

Chemical Formula 2-1

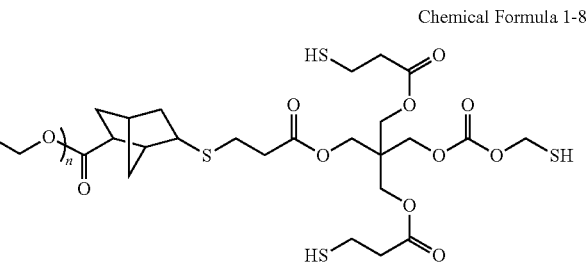

Chemical Formula 2-2

In Chemical Formulae 2-1 and 2-2, $Z_1$ to $Z_3$ are each independently *—$Y_2$—$X_n$ as defined for the Chemical Formula 2;

Chemical Formula 2-3

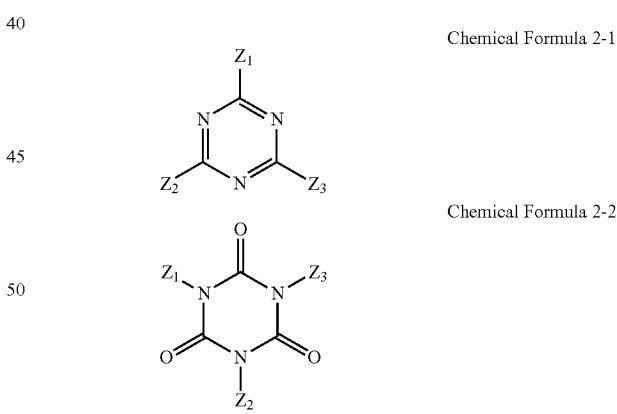

wherein in Chemical Formula 2-3, $L_2'$ is carbon; a substituted or unsubstituted C1 to C30 alkane-derived group (e.g., tetravalent alkane-derived group); a substituted or unsubstituted C2 to C30 alkene-derived group (e.g., tetravalent alkene-derived group); a C1 to C30 alkane-derived group (e.g., tetravalent alkane-derived group) wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), C6 to C10 cycloalkylene group, or a combination thereof; a C2 to C30 alkene derived group (e.g., tetravalent alkene-derived group) wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), a C6 to C10 cycloalkylene group, or a combination thereof; a substituted or unsubstituted C6 to C30 arene-derived group (e.g., tetravalent arene-derived group); a substituted or unsubstituted C3 to C30 heteroarene-derived group (e.g., tetravalent heteroarylene-derived group); a substituted or unsubstituted C3 to C30 cycloalkane-derived group (e.g., tetravalent cycloalkane-derived group); or a substituted or unsubstituted C3 to C30 heterocycloalkane-derived group (e.g., tetravalent heterocycloalkane-derived group), each of $Y_a$ to $Y_d$ are each independently a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R'_a$ to $R'_d$ of Chemical Formula 2 are $R^2$ or X of Chemical Formula 2, provided that at least two of $R'_a$ to $R'_d$ are X of Chemical Formula 2.

In an embodiment, the second monomer may include a compound of the following Chemical Formula 2-4, a compound of the following Chemical Formula 2-5, a compound of the following Chemical Formula 2-6, a compound of the following Chemical Formula 2-7, a compound of the following Chemical Formula 2-8, a compound of the following Chemical Formula 2-9, a compound of the following Chemical Formula 2-10, a compound of the following Chemical Formula 2-11, a compound of the following Chemical Formula 2-12, a compound of the following Chemical Formula 2-13, a compound of the following Chemical Formula 2-14, a compound of the following Chemical Formula 2-15, or a combination thereof.

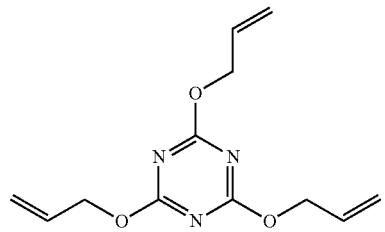

Chemical Formula 2-4

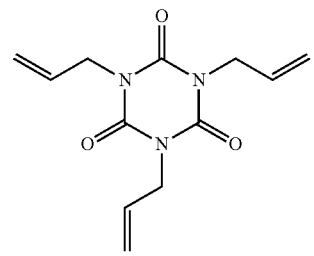

Chemical Formula 2-5

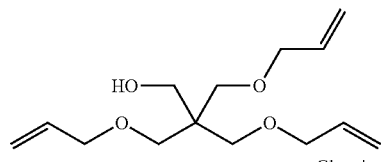

Chemical Formula 2-6

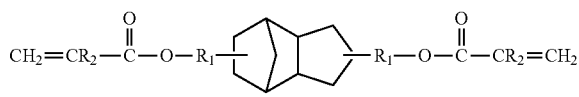

Chemical Formula 2-7

In Chemical Formula 2-7, $R_1$ is a C1 to C20 alkylene group and a C1 to C20 alkylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R_2$ is hydrogen or a methyl group;

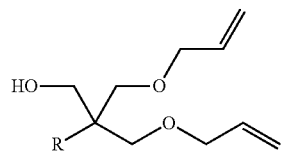

Chemical Formula 2-8 wherein in Chemical Formula 2-8,

R is a C1 to C10 alkyl group;

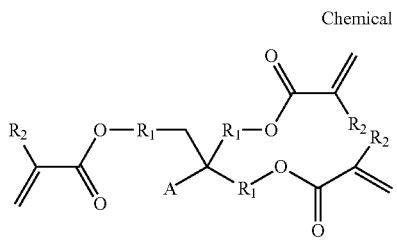

Chemical Formula 2-9 wherein in Chemical Formula 2-9,

A is a C1 to C10 alkyl group or a hydroxy group, $R_1$ is a single bond, a C1 to C20 alkylene group, and a C1 to C20 alkylene wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R_2$ is hydrogen or a methyl group;

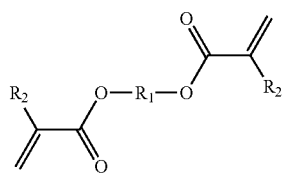

Chemical Formula 2-10 wherein in Chemical Formula 2-10, $R_1$ is a single bond, a C1 to C20 alkylene, or C1 to C20 alkylene wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R_2$ is hydrogen or a methyl group;

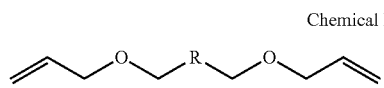

Chemical Formula 2-11 wherein in Chemical Formula 2-11,

R is a single bond, a C1 to C20 alkylene and C1 to C20 alkylene wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof,

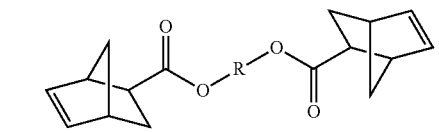

Chemical Formula 2-12 wherein in Chemical Formula 2-12,

R is a C1 to C20 alkylene, or a C1 to C20 alkylene wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof,

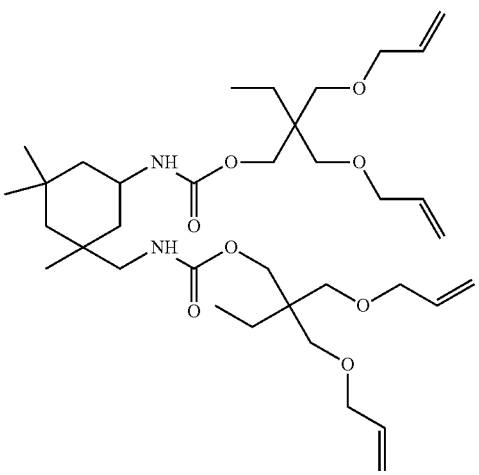

Chemical Formula 2-13

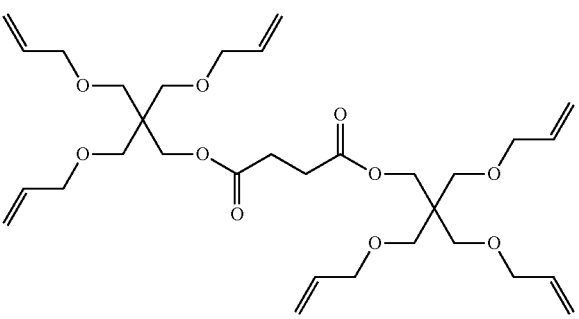

Chemical Formula 2-14

Chemical Formula 2-15

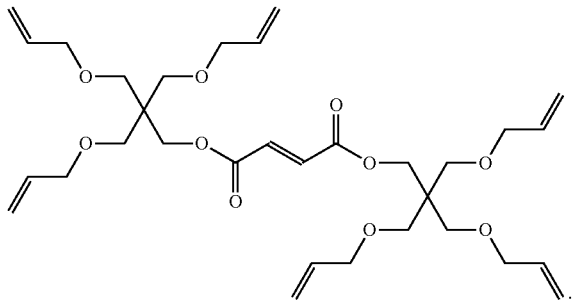

In the monomer combination, an amount of the first monomer and second monomer may be adjusted in order to obtain desirable properties of the resulting polymer. For example, in the monomer combination, the first monomer and the second monomer may be present in such amounts that a mole ratio of the thiol group of the first monomer to the carbon-carbon unsaturated bond of the second monomer may be about 1:0.1 to about 1:10, for example, about 1:about 0.2 to 1:5, about 1:about 0.75 to 1:3, about 1:about 1.1 to 2, or about 1:about 1.5 to 1.8. While not wishing to be bound by a theory, it is understood that when the monomer combination includes the first and second monomers within the above ranges, a polymer composite manufactured therefrom may have a high density network and thus excellent mechanical strength and properties.

The composition for the light emitting particle-polymer composite may further include a third monomer having one thiol group located at a terminal end of the third monomer or a fourth monomer having one unsaturated carbon-carbon bond located at a terminal end of the fourth monomer, or both of the third and fourth monomers. The third monomer may be a compound in which each of m and k2 is 1 in Chemical Formula 1, and the fourth monomer may be a compound in which each of n and k4 is 1 in Chemical Formula 2.

Examples of the third monomer may be a C1 to C20 alkyl 3-mercaptopropionate(alkyl 3-mercaptopropionate), alkyl thioglycolate, a C1 to C20 thiol-substituted (meth)acrylate, a C1 to C20 thiol-substituted silane, for example (3-mercaptopropyl)trimethoxysilane, but are not limited thereto.

Examples of the fourth monomer may be (meth)acrylates such as isobornyl(meth)acrylate, isooctyl(meth)acrylate, lauryl(meth)acrylate, benzoyl(meth)acrylate, norbornyl (meth)acrylate, cyclohexyl(meth)acrylate, n-hexyl(meth) acrylate, isooctyl(meth)acrylate, butyl(meth)acrylate, adamantyl acrylate, and cyclopentyl acrylate, vinyl ether, alkyl ether, propenyl ether, alkenes such as pentene, and hexene, unsaturated ester, maleimide, acrylonitrile, styrene, diene, N-vinyl amide, and the like, but are not limited thereto.

The amounts of the third monomer and the fourth monomer are not particularly limited, and may be appropriately selected considering miscibility, viscosity, releasing properties, and optical properties. For example, the third monomer such as (3-mercaptopropyl)trimethoxysilane may be used in an amount of less than or equal to about 30 parts by weight, for example less than or equal to about 20 parts by weight, less than or equal to about 15 parts by weight, or less than or equal to about 10 parts by weight based on 100 parts by weight of the monomer combination, and the fourth monomer such as the lauryl methacrylate monomer may be used in an amount of less than or equal to about 30 parts by weight, for example less than or equal to about 20 parts by weight, less than or equal to about 15 parts by weight, less than or equal to about 12 parts by weight, or less than or equal to about 10 parts by weight, without limitation. While not wishing to be bound by a theory, it is understood that within the above ranges, a composite manufacturing process may be smoothly carried out while ensuring mechanical properties of the composite.

The monomer combination may further include an initiator so as to promote a polymerization initiation reaction. The initiator may be a phosphine oxide compound, an α-amino ketone, phenylglyoxylate, a monoacyl phosphine, a benzylmethyl ketal, a hydroxyketone, azobisisobutyronitrile, benzoyl peroxide, and the like.

In an embodiment, the barrier coating composition may provide a clay-polymer composite including a cross-linked polymer formed by polymerization between the first monomer and the second monomer and the clay particle dispersed in the cross-linked polymerization product, or a barrier coating including the same. In the clay-polymer composite or the barrier coating including the same, details of the first monomer, the second monomer, and the clay particle are the same as described above.

The first monomer and the second monomer may form a highly cross-linked polymer through a polymerization mechanism as shown in FIG. 1. Referring to FIG. 1, a thiyl radical may be formed from a thiol group by an initiation reaction using light and an initiator as needed. The formed thiyl radical may react with a carbon-carbon unsaturated bond to form a vinyl radical, which then may participate in a propagation reaction by reacting with the thiol or carbon-carbon unsaturated bond. The polymerization may be terminated by a recombination between the formed thiyl radical and thiyl radical, between the vinyl radical and the vinyl radical, or between the thiyl radical and the vinyl radical. In the monomer combination, since the first monomer includes two or more thiol groups (e.g., 3 thiol groups or 4 thiol groups) and the second monomer includes two or more unsaturated bonds, the polymer prepared from the monomer combination may have a highly densified cross-linking structure.

In addition, such a densified cross-linked polymer includes organo-modified clay particles dispersed in the monomer combination of the first and second monomers before polymerization. The clay particle may be included in an amount of about 0.1 to about 20 wt %, for example, about 1 wt % to about 15 wt % based on the total weight of the clay-polymer composite. The clay-polymer composite according to an embodiment may have a structure where a plurality of organo-modified clay particles including the organic compound on the surface thereof is dispersed in a highly cross-linked thiol-ene polymer network. Such organo-modified clay particles may increase haze of the composite without having a negative effect on its light transmittance. For example, as described above, the clay-polymer composite or the barrier coating including the same may have transmittance of greater than or equal to about 85%, for example, greater than or equal to about 90%, for visible light.

In the clay-polymer composite, the clay particles do not permeate gases due to its high-density crystal structure. Accordingly, a gas transfer path is remarkably prolonged in the clay-polymer composite according to an embodiment, and thus, the composite or a coating including this composite may show a remarkably low gas (e.g., oxygen) transmission rate. In addition, the clay particles have a long-chained hydrocarbyl group on their surface, and the above clay-polymer composite may have sufficiently high resistance against water transmission without an additional water-repellent treatment. Accordingly, a clay-polymer composite according to an embodiment or a barrier coating including the clay-polymer composite may show high resistance against oxygen and water transmissions. For example, the clay composite may have an oxygen transmittance rate (OTR) measured at 23° C. under relative humidity (RH) of 0% according to ASTM D 3985 or JIS K 7128-2 with Oxytran (Mocon Inc.) of less than or equal to about 5 grams per square meter per day ($cc/m^2/day/atm$).

The clay composite may have a water vapor transmittance rate (WVTR) measured at 37° C. under relative humidity of 100% according to JIS K7129B with Aquatran (Mocon Inc.) and the like, of less than or equal to about 5 grams per square meter per day ($g/m^2/day$).

The above clay-polymer composite or the barrier coating including the same shows a high light transmission rate and excellent gas/moisture blocking characteristics, and thus may be used as a barrier layer of a quantum dot-polymer matrix. Accordingly, in another embodiment, a quantum dot-polymer composite article includes:

a quantum dot-polymer composite that includes a polymer host matrix and a plurality of quantum dot dispersed in the polymer host; and a barrier coating disposed on at least a portion of the surface of the quantum dot polymer composite.

The barrier coating includes:

a cross-linked polymerization product of a first monomer having at least two thiol (—SH) groups at its terminal end and a second monomer having at least two carbon-carbon unsaturated bond-containing groups at its terminal end; and a plurality of organo-modified clay particles dispersed in the cross-linked polymerization product, wherein the organo-modified clay particles including a compound having a hydrocarbyl group linked to a heteroatom, and wherein the compound is a primary, secondary, or tertiary amine, a quaternary organoammonium salt, a primary, secondary, or tertiary phosphine, a quaternary organophosphonium salt, a thiol including an amine group, or a combination thereof.

Figure 2:
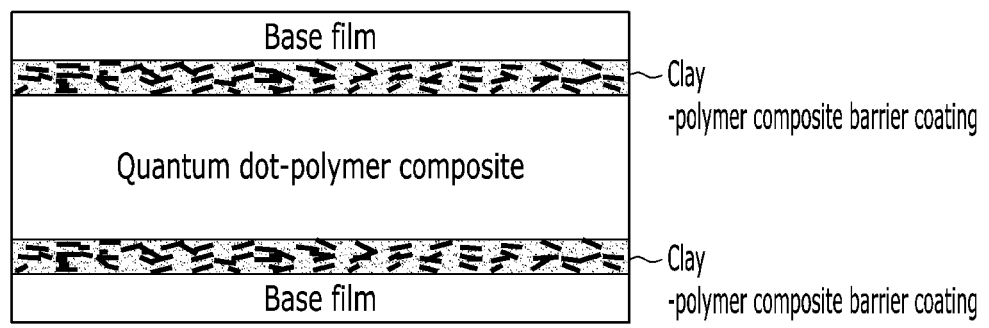
FIG. 2 is a schematic view showing a cross-section of a quantum dot-polymer composite article according to an embodiment.

The barrier coating may have one layer or two or more layers. When the barrier coating has two layers, each layer may include the same as or different composition and thickness. The thickness of the barrier coating is not particularly limited, and may be adjusted as desired. For example, the barrier coating may have a thickness of greater than or equal to about 1 um, for example greater than or equal to about 50 um, without limitation. For example, the barrier coating may have a thickness of less than or equal to about 300 um, for example, less than or equal to about 200 um, without limitation. The barrier coating may be formed from the barrier coating composition or the clay-polymer composite. On the barrier coating, a base film of a transparent polymer such as polyester, polycarbonate, polyimide, polyamide, and PET or a transparent inorganic material substrate may be provided. FIG. 2 is a schematic view showing the cross-section of a quantum dot-polymer composite article according to an embodiment. Referring to FIG. 2, the above clay-polymer composite is provided as a barrier coating on both sides of a quantum dot polymer composite, and a base film may be provided on the barrier coating. Alternatively, the above clay-polymer composite may be provided as a barrier coating on one side of the quantum dot polymer composite.

Since a quantum dot is a light emitting material having high color purity and improved color reproducibility, a quantum dot-polymer composite obtained by dispersing the quantum dot in a polymer host matrix is widely used as various lighting elements, or a light emitting diode used in a backlight unit for a display or a quantum dot sheet for improving display quality of the display. This quantum dot-polymer composite includes various barrier films for protecting a quantum dot included therein from oxygen and moisture. This barrier film mostly has a metal oxide thin layer such as $SiO_2$, $TiO_2$, or $Al_2O_3$ layer disposed on a polymer substrate. This metal oxide thin layer is formed by physical deposition (e.g., sputtering or thermal evaporation) requiring expensive vacuum equipment, plasma enhanced chemical vapor deposition (PECVD), and atomic layer deposition. In addition, a conventional barrier film includes at least two metal oxide layers in order to decrease a pinhole defect, and thus, the devise including the barrier film has a high price.

Technologically, the conventional barrier film for a QD-polymer composite has an insufficient close contacting property on the interface between a polymer host matrix and a metal oxide, since the metal oxide layer is positioned on the side that contacts the QD-polymer composite. In order to solve this problem, the metal oxide layer is coated with an organic silane compound or an organic/inorganic composite overcoat including siloxane and polyacrylate disposed on the surface of the metal oxide layer, but this process further increases a cost for forming the barrier layer.

On the contrary, a barrier coating including the above clay-polymer composite may play a role of a barrier against oxygen and moisture with a remarkably decreased cost when applied to the surface of the quantum dot-polymer composite. In addition, the above clay-polymer composite, unlike the metal oxide layer, has an excellent interface close contacting property with the surface of the quantum dot polymer composite, and thus needs no particular surface treatment. Furthermore, the above clay-polymer composite shows high light transmittance, and thus has almost no negative influence on the light emitting characteristics of a quantum dot.

In an embodiment, the above quantum dot-polymer composite article may be manufactured by preparing a quantum dot polymer composite, coating the barrier coating composition on at least a part of the surface of the quantum dot polymer composite, and curing the barrier coating composition. According to another embodiment, the above quantum dot-polymer composite article may be manufactured by laminating a barrier coating including the above clay-polymer composite on at least a part of the surface of the quantum dot polymer composite (e.g., one surface or both surfaces). When the above clay-polymer composite is disposed on a base film, the quantum dot polymer composite article may be manufactured by disposing the surface of the quantum dot polymer composite to face the surface of the above clay-polymer composite.

Details for the barrier coating composition or the clay-polymer composite for a barrier coating (e.g., details of the first monomer, the second monomer, the cross-linked polymerization product thereof, the organo-modified clay particles in the barrier coating) are the same as described above. Hereinafter, a quantum dot-polymer composite is described.

The quantum dot-polymer composite may have any shape or size, but are generally spherical, ellipsoidal, polyhedral, or irregular in shape. For example, the quantum dot-polymer composite may have a sheet shape, a bar shape, a pipe shape, or a tube shape. For example, the quantum dot-polymer composite may be manufactured by using a mold or by casting to have various thicknesses and forms.

In the quantum dot-polymer composite, the quantum dot (hereinafter, also referred to as a semiconductor nanocrystal) is not particularly limited, and may be any known or commercially available quantum dot. For example, the quantum dot may include a Group II-VI compound, a Group III-V compound, a Group IV-VI compound, a Group IV compound, or a combination thereof. The quantum dot-polymer composite may further include a light emitting particle such as a metal nanocrystal, a metal oxide nanocrystal, a phosphor, a pigment, or a combination thereof as needed.

The Group II-VI compound may be
a binary element compound such as CdSe, CdTe, ZnS, ZnSe, ZnTe, ZnO, HgS, HgSe, HgTe, MgSe, MgS, or a combination thereof;
a ternary element compound such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, or a combination thereof; and
a quaternary element compound such as HgZnTeS, CdZnSeS, CdZnSeTe, CdZnSTe, CdHgSeS, CdHgSeTe, CdHgSTe, HgZnSeS, HgZnSeTe, HgZnSTe, or a combination thereof.

The Group III-V compound may be
a binary element compound such as GaN, GaP, GaAs, GaSb, AlN, AlP, AlAs, AlSb, InN, InP, InAs, InSb, or a combination thereof;
a ternary element compound such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, or a combination thereof; and
a quaternary element compound such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, or a combination thereof.

The Group IV-VI compound may be a binary element compound such as SnS, SnSe, SnTe, PbS, PbSe, PbTe, or a combination thereof;
a ternary element compound such as SnSeS, SnSeTe, SnSTe, PbSeS, PbSeTe, PbSTe, SnPbS, SnPbSe, SnPbTe, or a combination thereof; and
a quaternary element compound such as SnPbSSe, SnPbSeTe, SnPbSTe, or a combination thereof.

The Group IV compound may be
a singular element compound such as Si, Ge, or a combination thereof; and
a binary element compound such as SiC, SiGe, or a combination thereof.

The binary element compound, the ternary element compound, or the quaternary element compound may be present in a uniform concentration in a particle, or may be present in a locally different concentration in a single particle. The semiconductor nanocrystal may have a core/shell structure, wherein a semiconductor nanocrystal surrounds another (different) semiconductor nanocrystal. The core and shell may have an interface, and an element in of at least one of the core or the shell in the interface may have a concentration gradient wherein the concentration of the element(s) of the shell decreases toward the core. The semiconductor nanocrystal may have one core of a semiconductor nanocrystal and multi-shells surrounding the core. The core and multi-shell structure has at least two shells, wherein each shell may be a single composition, an alloy, or the one having a concentration gradient.

In addition, in the semiconductor nanocrystal, the materials of the shell may have a larger energy bandgap than that of the core, and thereby the semiconductor nanocrystal may exhibit a quantum confinement effect more effectively. In case of a multi-shell type of semiconductor nanocrystal particle, the bandgap of the material of an outer shell may be higher energy than that of the material of an inner shell (a shell that is closer to the core). In this case, the semiconductor nanocrystal may emit light of a wavelength ranging from UV to infrared light.

The semiconductor nanocrystal may have quantum efficiency of greater than or equal to about 10%, for example, greater than or equal to about 30%, greater than or equal to about 50%, greater than or equal to about 60%, greater than or equal to about 70%, or greater than or equal to about 90%.

The semiconductor nanocrystal may be designed to have a wider or narrower full width at half maximum (FWHM) in its photoluminescence spectrum depending on its application. By way of an example, for use in display devices, the semiconductor nanocrystal may have a narrower FWHM so as to realize enhanced color purity or color reproducibility. The semiconductor nanocrystal may have a FWHM of less than or equal to about 45 nanometers (nm), for example less than or equal to about 40 nm, or less than or equal to about 30 nm. While not wishing to be bound by a theory, it is understood that within such ranges, a device including the semiconductor nanocrystal may have enhanced color purity or improved color reproducibility.

The quantum dot may have a particle diameter (the longest diameter in case of a non-spherical particle) ranging from about 1 nm to about 100 nm, for example about 1 nm to 10 nm.

The shape of the quantum dot is not particularly limited. By way of an example, the quantum dot may have a spherical shape, a pyramidal shape, a multi-arm shape, or a cubic shape. The quantum dot may be in the form of a nanoparticle, a nanotube, a nanowire, a nanofiber, a nanosheet.

The quantum dot may be commercially available or may be prepared in any method. For example, the quantum dot may be prepared by the method described hereinbelow, but it is not limited thereto.

In a non-limiting example, the quantum dot having a several nanometer size may be prepared via a wet chemical method. In the wet chemical method, precursors react in an organic solvent to grow nanocrystal particles, and the organic solvent or a ligand compound may coordinate the surface of the quantum dot, thus providing the crystal growth. As the coordinated organic solvents on the surface of the quantum dot may adversely affect the stability of the device, extra organic materials not coordinating the surface of the quantum dot may be removed by adding the quantum dot in an excess amount of a non-solvent and centrifuging the resulting mixture. Examples of the non-solvent may include, but are not limited to, acetone, ethanol, methanol, and the like. After the removal of extra organic materials, the amount of the organic materials coordinated on the surface of the quantum dot may be less than or equal to about 35% by weight.

The organic materials may include a ligand compound, an organic solvent, or a combination thereof. The ligand compound may be any organic compound that may be used as a ligand compound in the wet chemical method, and the types thereof are not particularly limited. For example, the ligand compound may be RCOOH, $RNH_2$, $R_2NH$, $R_3N$, RSH, $R_3P(=O)$, $R_3P$, ROH, $RC(=O)OR'$, $RP(=O)(OH)_2$, $R_2P(=O)OH$ (wherein R and R' are independently a C1 to C24 alkyl group or a C5 to C20 aryl group), or a combination thereof. The organic ligand compound may be coordinated to the surface of the quantum dots at the time the quantum dots are prepared to well-dispersing the quantum dots in a solution, and to modulate the light-emitting and electrical characteristics of the quantum dots. Examples of the organic ligand compound may include, but are not limited to: a thiol such as methane thiol, ethane thiol, propane thiol, butane thiol, pentane thiol, hexane thiol, octane thiol, dodecane thiol, hexadecane thiol, octadecane thiol, and benzyl thiol; an amine such as methane amine, ethane amine, propane amine, butane amine, pentane amine, hexane amine, octane amine, dodecane amine, hexadecyl amine, octadecyl amine, dimethyl amine, diethyl amine, and dipropyl amine; an acid such as methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, and benzoic acid; a phosphine such as methyl phosphine, ethyl phosphine, propyl phosphine, butyl phosphine, pentyl phosphine, and the like; an oxide compound thereof such as methyl phosphine oxide, ethyl phosphine oxide, propyl phosphine oxide, butyl phosphine oxide, and the like; diphenyl phosphine, a triphenyl phosphine compound or an oxide compound thereof; and phosphonic acid. The organic ligand compound may be used alone or as a combination of two or more compounds. The solvent may be any solvent used in the wet chemical method, and the types thereof are not particularly limited. For example, the solvent may be a C6 to C22 primary alkylamine such as hexadecylamine; a C6 to C22 secondary alkylamine such as dioctylamine; a C6 to C40 tertiary alkylamine such as trioctylamine; a nitrogen-containing heterocyclic compound such as pyridine; a C6 to C40 aliphatic hydrocarbon (e.g., alkane, alkene, alkyne, and the like) such as hexadecane, octadecane, octadecene, and squalane; a C6 to C30 aromatic hydrocarbon such as phenyldodecane, phenyltetradecane, and phenyl hexadecane; a phosphine substituted with a C6 to C22 alkyl group such as trioctylphosphine; a phosphine oxide substituted with a C6 to C22 alkyl group such as trioctylphosphine oxide; and a C12 to C22 aromatic ether such as phenyl ether, benzyl ether, or a combination thereof, but it is not limited thereto.

The quantum dot-polymer composite may be prepared by using any known method or may be commercially available. In a non-limiting example, the quantum dot-polymer composite may be prepared by contacting (for example, mixing) the above quantum dot or its organic solvent dispersion (e.g., a quantum dot dispersion in chloroform, hexene, or a liquid acryl monomer) with a polymer for a host matrix or its precursor (e.g., a monomer or an oligomer), selectively removing the solvent, and performing polymerization (or a cross-linking reaction) (by heating or radiating light) if needed.

The polymer or precursor (e.g., a monomer or oligomer) for the host matrix may include a thiol-ene polymer a cross-linked or uncross-linked poly(meth)acrylate polymer, an epoxy polymer, an epoxy(meth)acrylate polymer, a silicone polymer, a silicon(meth)acrylate polymer, a polyurethane(meth)acrylate polymer, a melamine(meth)acrylate polymer, a vinyl polymer, or a combination thereof, but is not limited thereto. Details for the first monomer and the second monomer are the same as described above. These polymers may be readily prepared by any method known to one of ordinary skill in the art, or polymers having desirable molecular weights or precursors (e.g., monomers or oligomers having a molecular weight of 1,000 to 20,000 g/mol) may be commercially available.

In another embodiment, an electronic device including the quantum dot-polymer composite article is provided. The electronic device may be a display, a light emitting device such as a backlight unit for a liquid crystal display device, a memory device, a laser device, or a solar cell. The light emitting device includes a light source, and the quantum dot-polymer composite article is positioned on the light source in such a way that light emitted from the light source transmits through the article.

The device may be manufactured according to any method known to one of ordinary skill in the art. In a non-limiting example, a backlight unit for a liquid crystal display device is described hereinbelow.

The backlight unit includes:

an LED light source; and a light conversion layer disposed separately from the LED light source to convert light emitted from the LED light source to white light and to provide the white light to a liquid crystal panel.

The backlight unit may further include a light guide panel disposed between the LED light source and the light conversion layer.

The light conversion layer includes the quantum dot-polymer composite article. Details of quantum dot-polymer composite article are the same as described above. Hereinbelow, a backlight unit according to an embodiment and a liquid crystal display device including the same are explained with reference to the drawings.

Figure 5:
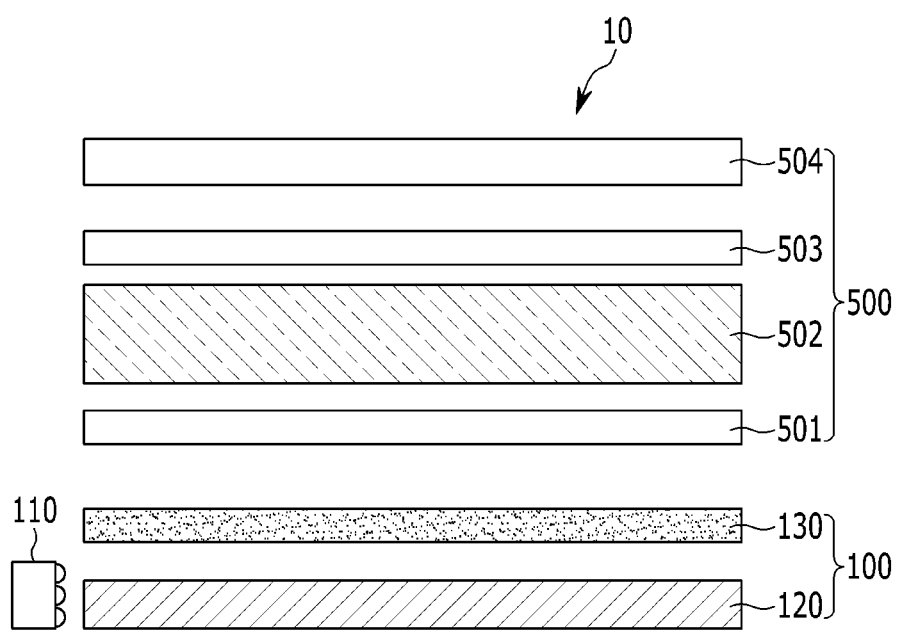
FIG. 5 is a schematic view showing a liquid crystal display device to which a backlight unit including a quantum dot-polymer composite article according to an embodiment is applied.

FIG. 5 is a schematic view of a liquid crystal display device 10 including a backlight unit in accordance with an embodiment.

Referring to FIG. 5, the liquid crystal display device 10 includes a backlight unit 100 and a liquid crystal panel 500 to provide a predetermined colored image using white light provided from the backlight unit 100.

The backlight unit 100 includes a light emitting diode ("LED") light source 110, a light conversion layer 130 to convert light emitted from the LED light source 110 to white light, and a light guide panel 120 disposed therebetween to guide the light emitted from the LED light source 110 to the light conversion layer 130. The LED light source 110 includes a plurality of LED chips emitting light having predetermined wavelengths. The LED light source 110 may be a blue light-emitting LED light source or an ultraviolet (UV)-emitting LED light source, for example.

A reflector (not shown) may be further disposed on the lower surface of the light guide panel 120.

The light conversion layer 130 is spaced apart from the LED light source 110 by a predetermined distance and converts light emitted from the LED light source 110 to white light, which is then transmitted to the liquid crystal panel 500.

Herein, the light conversion layer 130 includes the quantum dot-polymer composite article according to an embodiment. Details of the quantum dot-polymer composite article are the same as described above.

The backlight unit 100 may further include a diffusion plate on a light guide panel 120, and the light conversion layer 130 may be disposed between the light guide panel and the diffusion plate, or on a side of the diffusion plate which is opposite the light guide panel. Materials and structures for each of the LED light source 110, the light guide panel, the diffusion plate, and the liquid crystal panel are known in the art and are commercially available, and thus are not particularly limited.

When the light emitted from the LED light source 110 is passed through the light conversion layer 130, blue light, green light, and red light are mixed to emit white light. By changing the compositions and sizes of semiconductor nanocrystals in the light conversion layer 130, the blue light, green light, and red light may be controlled to a desirable ratio, so as to provide white light which provides excellent color reproducibility and color purity.

In an embodiment, the light conversion layer 130 may include a plurality of layers. In an embodiment, the plurality of layers may be disposed in such a way that that the light emitting wavelength becomes longer in a direction towards the LED light source 110. For example, if the LED light source 110 is a blue LED light source, the light conversion layer 130 may include a red light conversion layer and a green light conversion layer that are sequentially stacked in a direction away from the LED light source 110.

Even though not shown in FIG. 5, on the light conversion layer 130, a film, e.g., a diffusion plate, a prism sheet, a microlens sheet, a brightness enhancement film (e.g., double brightness enhancement film ("DBEF")), or a combination thereof, may be further disposed. In addition, the light conversion layer 130 may be disposed between at least two films, e.g., a light guide panel, a diffusion plate, a prism sheet, a micro-lens sheet, a brightness enhancement film (e.g., a double brightness enhancement film ("DBEF")), or a combination thereof.

The white light emitted from the backlight unit 100 is incident toward the liquid crystal panel 500. The liquid crystal panel 500 provides a predetermined color image using the white light incident from the backlight unit 100. The liquid crystal panel 500 may have a structure in which a first polarizer 501, a liquid crystal layer 502, a second polarizer 503, and a color filter 504 are sequentially disposed. The white light emitted from the backlight unit 100 is transmitted through the first polarizer 501, the liquid crystal layer 502, and the second polarizer 503, and then into the color filter 504 to form a predetermined color image.

The liquid crystal panel is not particularly limited, and any liquid crystal panel that is known in the art or is commercially available may be included. Details for the liquid crystal display device are the same as set forth above.

Hereinafter, the embodiments are illustrated in more detail with reference to examples. However, they are exemplary embodiments of the present disclosure, and the present inventive concept is not limited thereto.

EXAMPLE

Example 1-1

Clay-polymer Composite I

A clay-monomer composition is prepared by mixing 3.5 grams (g) of clay (Manufacturer: Co-op Chemical Co., Ltd., Product name: STN) having quaternary organoammonium salt including three C8 linear alkyl groups on its surface with 30 g of pentaerythritol tetrakis(3-mercaptopropionate) (Product name: THIOCURE PETMA, Manufacturer: Bruno Bock Chem.), 20 g of 1,3,5-triallyl-1,3,5-triazine-2,4,6(1H, 3H,5H)-trione (Product name: TAIC, Manufacturer: Nippon Kasei Chemical), and 0.5 g of Irgacure TPO (Manufacturer: BASF) as a photoinitiator.

The obtained composition is bar-coated on a 125 micrometer (μm)-thick PET base film with a wire bar and optionally cured by radiating UV (light intensity: 1,500 milliJoules per square centimeter ($mJ/cm^2$)) for 30 seconds to obtain a 100 μm-thick clay-polymer composite film (7 parts by weight of clay based on 100 parts by weight of a monomer mixture).

Figure 3:
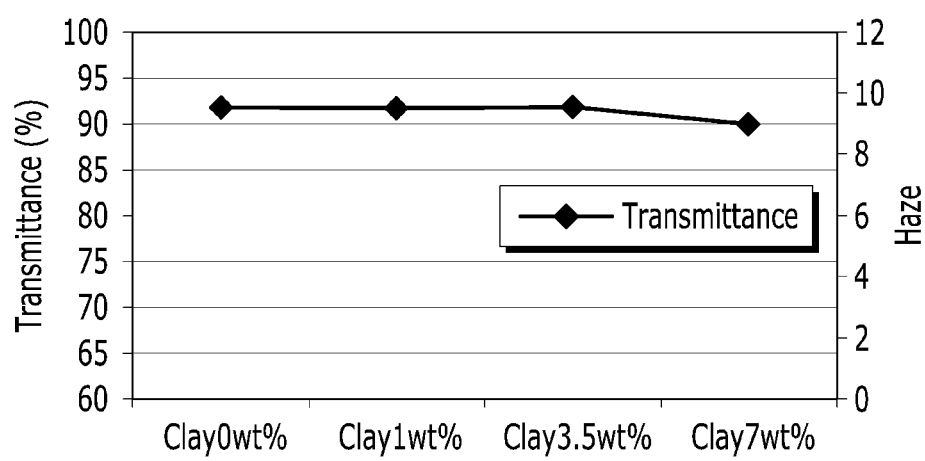
FIG. 3 is a graph of transmittance (percent, %) versus amount of clay (percent by weight, wt %) and haze showing transmittance variation according to increase of clay amounts in Examples 1-1 to 1-3.

Light transmittance of the obtained composite is measured by using a haze measure group (a haze meter, Nippon Denshoku, NDH 7000SP), and FIG. 3 shows the results.

The results of FIG. 3 confirm that the composite has a transmittance of greater than or equal to 90% with respect to visible light.

Then, oxygen transmittance rate of the composite is measured by using Oxytran (Mocon Inc.) according to JIS K7126-2.

Water transmission rate of the composite is measured by using Aquatran (Mocon Inc.) according to JIS K7129B.

As a result, the composite has an oxygen transmission rate (OTR) of less than 5 cubic centimeters per square meter per day per atmosphere ($cc/m^2/day/atm$) and a water transmission rate (WVTR) of less than 5 grams per square meter per day ($g/m^2/day$).

Example 1-2

Clay-polymer Composite I

A clay-polymer composite (3.5 parts by weight of clay based on 100 parts by weight of a monomer mixture) is manufactured according to the same method as described in Example 1, except for using 1.75 g of the clay. Haze of the composite is measured by the following method, and the results are provided in FIG. 4.

Light transmittance of the composite is measured according to the same method as described in Example 1-1, and the results are provided in FIG. 3.

Referring to the results of FIG. 3, the composite has greater than or equal to 90% transmittance with regard to visible light.

In addition, oxygen transmittance rate and water transmission rate of the composite are measured according to the same method as described in Example 1-1.

As a result, the composite has an oxygen transmission rate of less than 5 $cc/m^2/day/atm$ and a water transmission rate of less than 5 $g/m^2/day$.

Example 1-3

Clay-polymer Composite I

A clay-polymer composite (1 part by weight of clay based on 100 parts by weight of a monomer mixture) is manufactured according to the same method as described in Example 1, except for using 0.5 g of the clay. Haze of the composite is measured by the following method, and the results are provided in FIG. 4.

In addition, light transmittance of the composite is measured according to the same method as described in Example 1-1, and the results are provided in FIG. 3.

Referring to the results of FIG. 3, the composite has greater than or equal to 90% transmittance with regard to visible light.

In addition, oxygen transmittance rate and water transmission rate of the composite are measured according to the same method as described in Example 1-1.

As a result, the composite has an oxygen transmission rate of less than 5 cc/m²/day/atm and a water transmission rate of less than 5 g/m²/day.

Example 2

Clay-polymer Composite II

A clay-polymer composite (7 parts by weight of clay 100 parts by weight of a monomer mixture) is manufactured according to the same method as described in Example 1, except for using 3.5 g of clay treated to include hexyltriphenylphosphonium bromide. The clay treated to include hexyltriphenylphosphonium bromide is manufactured by the following method: 20 g of hydrophilic clay (Manufacturer: Co-op Chemical Co., Ltd., Product name: SWN) is added to 1 liter (L) of distilled water, 300 mL of an aqueous solution obtained by dissolving 9.6 g of hexyltriphenylphosphonium bromide is added thereto, and the mixture is agitated for 2 hours.

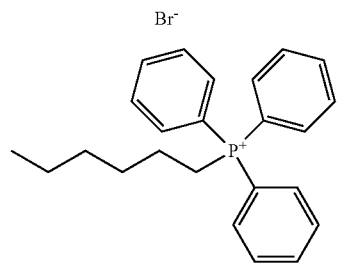 [SMILES: [Br-] ; CCCCCC[P+](c1ccccc1)(c1ccccc1)c1ccccc1]

The resulting material is filtered and dried to obtain clay having hexyltriphenylphosphonium bromide on the surface.

Haze and light transmittance of the composite are measured according to the same method as described in Example 1. As a result, the composite has greater than or equal to 90% transmittance with regard to visible light.

In addition, oxygen transmittance rate and water transmission rate of the composite are measured according to the same method as described in Example 1-1.

As a result, the composite has an oxygen transmission rate of less than 5 cc/m²/day/atm and a water transmission rate of less than 5 g/m²/day.

Example 3

Clay-polymer Composite III

A clay-polymer composite (3.5% parts by weight of clay based on 100 parts by weight of the monomer mixture) is manufactured according to the same method as described in Example 1, except for using 1.5 g of clay treated to include quaternary organoammonium salt with C6 linear alkyl groups (e.g., (n-hexyl)trimethylammonium bromide) (Manufacturer: Co-op Chemical, Co., Ltd., Product name: SPN):

Haze and light transmittance of the composite are measured according to the same method as described in Example 1. As a result, the composite has greater than or equal to 90% transmittance with regard to visible light.

In addition, oxygen transmittance rate and water transmission rates of the composite are measured according to the same method as described in Example 1-1.

As a result, the composite has an oxygen transmission rate of less than 5 cc/m²/day/atm and a water transmission rate of less than 5 g/m²/day.

Example 4

Clay-polymer Composite IV

A clay-polymer composite (3.5 parts by weight of clay based on 100 parts by weight of a monomer mixture) is manufactured according to the same method as described in Example 1, except for using 1.5 g of clay treated with a —CH₂CH₂O— residual group to have a quaternary organoammonium salt having at least one substituted C11 to C16 hydrocarbyl group (Manufacturer: Co-op Chemical, Co., Ltd., Product name: SEN).

Haze and light transmittance of the composite are measured according to the same method as described in Example 1. As a result, the composite has greater than or equal to 90% transmittance with regard to visible light.

In addition, oxygen transmittance and water transmission rates of the composite are measured according to the same method as described in Example 1-1.

As a result, the composite has an oxygen transmission rate of less than 5 cc/m²/day/atm and a water transmission rate of less than 5 g/m²/day.

Comparative Example 1-1

Thiol-ene Polymer Film I-1 Including No Clay

A thiol-ene polymer is prepared according to the same method as described in Example 1, except for including no clay having dioctadecyldimethylammonium chloride on the surface.

Light transmittance of the film manufactured by using the polymer is measured by the same method as described in Example 1-1. As a result, the polymer film has 90% transmittance with regard to visible light.

Oxygen transmittance rate and water transmission rate of the composite are measured according to the same method as described in Example 1-1.

As a result, the composite has an oxygen transmission rate of greater than 5 cc/m²/day/atm and a water transmission rate of greater than 5 g/m²/day.

Comparative Example 1-2

Thiol-ene Polymer Film 1-2 Including No Clay

A thiol-ene polymer is prepared according to the same method as described in Example 1, except for including no clay having dioctadecyldimethylammonium chloride on the surface and using no photoinitiator (TPO) but acrylate.

When haze of a film formed of the polymer film is measured according to the same method as described in Example 1-1, the polymer film has 90% transmittance with regard to visible light.

Oxygen transmittance and water transmission rates of the composite are measured according to the same method as described in Example 1-1.

As a result, the composite has an oxygen transmission rate of greater than 5 cc/m$^2$/day/atm and a water transmission rate of greater than 5 g/m$^2$/day.

Comparative Example 2

A barrier film (Product name: X Barrier, Manufacturer: Mitsubishi Plastics, Inc.) obtained by forming a SiO$_2$ thin film on a PET base film through sputtering is prepared.

Comparative Example 3

A clay-monomer composition is prepared by mixing 3.5 g of clay having no organic compound on the surface (Manufacturer: Co-op Chemical Co., Ltd., Product name: SWN) with 20 g of pentaerythritol tetrakis(3-mercaptopropionate) (Product name: THIOCURE PETMA, Manufacturer: Bruno Bock Chem.), 30 g of 1,3,5-triallyl-1,3,5-triazine-2,4,6(1H,3H,5H)-trione (Product name: TAIC, Manufacturer: Nippon Kasei Chemical), and 0.5 of Irgacure TPO (Manufacturer: BASF) as a photoinitiator.

The composition is bar-coated on a 125 μm-thick PET base film with a wire bar and optically cured by radiating UV (Light intensity: 1,500 milliJoules per square centimeter (mJ/cm$^2$)) for 0.5 minute to obtain a 100 μm-thick clay-polymer composite film (7 parts by weight of clay based on 100 parts by weight of a monomer mixture).

The obtained composition and composite film are found to have white turbidity and thus to have transmittance of 0%. This composite film cannot be used as a barrier coating.

Comparative Example 4

Using a Natural Clay

A clay-polymer composite (7 parts by weight of clay based on 100 parts by weight of a monomer mixture) is manufactured according to the same method as described in Example, 1 except for using 3.5 g of natural clay treated with octadecylamine (Manufacturer: Sigma-Aldrich Co. Ltd., Natural Clay).

Light transmittance of the composite is measured according to the same method as described in Example 1-1. As a result, the composite shows insufficient transmittance of about 80% with respect to visible light. The composite film is not appropriate as a barrier coating.

Comparative Example 5

A clay-polymer composite (7 parts by weight of clay based on 100 parts by weight of a monomer mixture) is manufactured according to the same method as described in Example 1, except for using 10 g of trimethylolpropanetriacrylate (TMPTA) and 0.1 of Irgacure TPO (Manufacturer: BASF) as a photoinitiator instead of the thiol-ene monomer mixture.

When haze of the polymer film is measured according to the same method as described in Example 1-1, the polymer film has 90% transmittance with regard to visible light.

In addition, oxygen transmittance rate and water transmission rate of the composite are measured according to the same method as described in Example 1-1.

As a result, the composite has an oxygen transmission rate of greater than 5 cc/m$^2$/day/atm and a water transmission rate of greater than 5 g/m$^2$/day.

Comparative Example 6

A clay-polymer composite (7 parts by weight of clay 100 parts by weight of a monomer mixture) is manufactured according to the same method as described in Example 1, except for using 50 g of polyvinyl alcohol (PVA) (Product name: Kuraray Poval, Manufacturer: Kuraray Inc.) instead of the thiol-ene monomer mixture, and is not optically cured.

When haze of the polymer film is measured according to the same method as described in Example 1-1, the polymer film has a transmittance of 90% with respect to visible light.

In addition, oxygen transmittance and water transmission rates of the composite are measured according to the same method as described in Example 1-1.

As a result, the composite has an oxygen transmission rate of greater than 5 cc/m$^2$/day/atm and a water transmission rate of greater than 5 g/m$^2$/day.

Example 5-1

Quantum Dot-polymer Composite Article I

[1] A monomer and oligomer mixture is prepared by mixing 30 parts by weight of lauryl methacrylate, 36 parts by weight of tricyclodecane dimethanol diacrylate, 4 parts by weight of trimethylolpropane triacrylate, 20 parts by weight of an epoxy diacrylate oligomer (Manufacturer: Sartomer), 1 part by weight of 1-hydroxy-cyclohexyl-phenylketone, and 1 part by weight of 2,4,6-trimethylbenzoyl-diphenyl-phosphine oxide. The mixture is foam-removed under vacuum.

A toluene dispersion including InP/ZnS semiconductor nanocrystals obtained after removing an excessive amount of an organic material through centrifugation [concentration: (absorption at 449 nm)×(volume of QD solution (mL)) =3.75] is mixed with an excess amount of ethanol, and the mixture is centrifuged. The separated semiconductor nanocrystal is dispersed in 0.15 g of lauryl methacrylate (10 parts by weight of the entire composition except for an initiator), then added to 1.35 g of the prepared monomer (oligomer) mixture. The resulting mixture is stirred to obtain a semiconductor nanocrystal composition.

About 1 g of the semiconductor nanocrystal composition is drop-casted on the surface of the clay-polymer composite of the barrier film (size: 10 cm×10 cm) according to Example 2. The barrier film of Example 2 is covered on the composition and then UV-cured for 10 seconds (light intensity: 100 mW/cm$^2$) to obtain a quantum dot-polymer composite article.

[2] Long-term Reliability Experiment

The quantum dot-polymer composite article is inserted between a light guide and an optical film (a prism sheet, microlens, or a luminance-fortified film) of a 40 inch TV equipped with a blue LED having a peak wavelength of 449 nm. The TV is operated to measure luminance about 45 centimeters (cm) in front of the TV with a spectroradiometer (Konica Minolta, CS-2000). The TV is operated in a chamber at a high temperature of 50° C. to measure luminance depending on time and to examine luminance change. The results are provided in FIG. 4.

Figure 4:
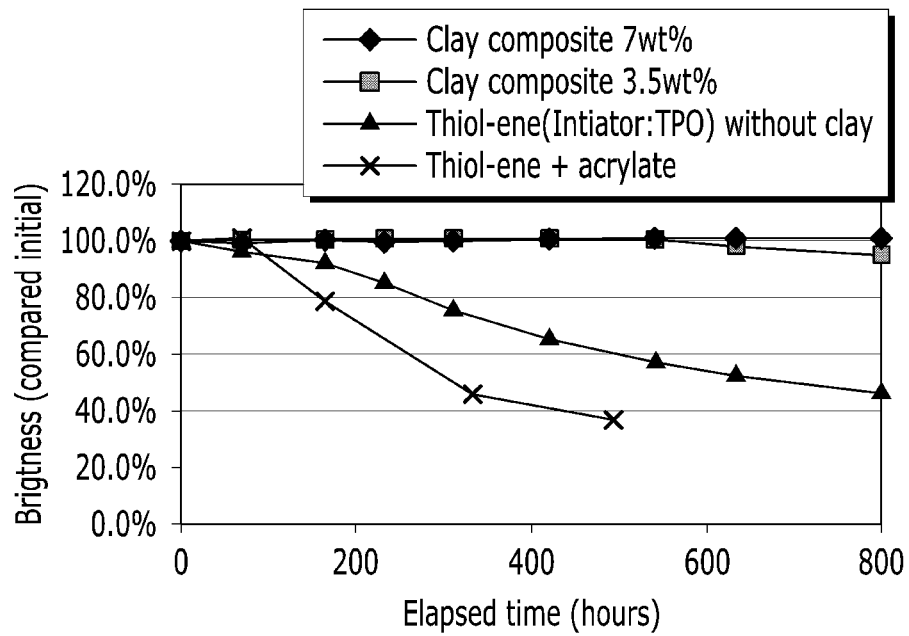
FIG. 4 is a graph of brightness (%, percent) versus elapsed time (hours) showing long-term reliability test results of quantum dot-polymer composite articles according to examples and comparative examples.

Referring to the results of FIG. 4, the quantum dot-polymer composite article substantially maintained initial luminance up to at least 800 hours (e.g., greater than or equal to 1,000 hours).

Example 5-2

Quantum Dot-polymer Composite Article I

[1] A quantum dot-monomer composition is obtained according to the same method as described in Example 5-1.

The obtained composition is vacuum-dried at room temperature for 1 hour to remove chloroform included therein.

1 g of the quantum dot composition is drop-casted on the surface of the clay-polymer composite of the barrier film according to Example 1-2. The surface of the clay composite of the barrier film is stacked to contact the quantum dot composition thereon, and a resulting material therefrom is UV-cured for 4 minutes (light intensity: 100 milliWatts per square centimeter (mW/cm$^2$)) to obtain a quantum dot-polymer composite article as shown in FIG. 2.

[2] Long-term Reliability Experiment

A long-term reliability experiment involving the quantum dot-polymer composite article is performed by the same method as described in Example 5-1, and the results are provided in FIG. 4.

Referring to the results of FIG. 4, the quantum dot-polymer composite article substantially maintains initial luminance up to at least 800 hours (e.g., greater than or equal to 1,000 hours).

Comparative Example 7-1

Quantum Dot-polymer Composite Article (thiol-ene Polymer Film I-1 Including No Clay)

[1] A quantum dot-monomer composition is obtained according to the same method as described in Example 5-1. The obtained composition is vacuum-dried at room temperature for one hour to remove chloroform included therein.

1 g of the quantum dot composition is drop-casted on the surface of the polymer film of Comparative Example 1-1. The polymer film is stacked on the quantum dot composition, and the resulting material obtained therefrom is UV-cured for 4 minutes (light intensity: 100 mW/cm$^2$) to obtain a quantum dot-polymer composite article.

[2] Long-term Reliability Experiment

A long-term reliability experiment involving the quantum dot-polymer composite article is performed according to the same method as described in Example 5-1, and the results are provided in FIG. 4.

As shown by the results of FIG. 4, the quantum dot-polymer composite article has luminance that is decreased to about 90% from the initial luminance after 200 hours and to about 40% from the initial luminance after 800 hours.

Comparative Example 7-2

Quantum Dot-polymer Composite Article (thiol-ene Polymer Film I-2 Including No Clay)

[1] A quantum dot-monomer composition is obtained according to the same method as described in Example 5-1. The composition is vacuum-dried at room temperature for 1 hour to remove chloroform included therein.

1 g of the quantum dot composition is drop-casted on the surface of the polymer film according to Comparative Example 1-2. The polymer film is stacked on the quantum dot composition, and a resulting material obtained therefrom is UV-cured (light intensity: 100 mW/cm$^2$) for 4 minutes to obtain a quantum dot-polymer composite article.

[2] Long-term Reliability Experiment

A long-term reliability experiment involving the quantum dot-polymer composite article is performed according to the same method as described in Example 5-1, and the results are provided in FIG. 4.

Referring to the results of FIG. 4, the quantum dot-polymer composite shows luminance that is decreased to about 80% from the initial luminance after 200 hours and to about 40% from the initial luminance after 500 hours.

Example 6

Quantum Dot-polymer Composite Article II

[1] A quantum dot-monomer composition is obtained according to the same method as described in Example 5-1. The composition is vacuum-dried at room temperature for 1 hour to remove chloroform included therein.

1 g of the quantum dot composition is drop-casted on the surface of the clay-polymer composite II of the barrier film of Example 2. The surface of the barrier is stacked to contact the quantum dot composition, and a resulting material obtained therefrom is UV-cured for 4 minutes (light intensity: 100 mW/cm$^2$) to obtain a quantum dot-polymer composite article as shown in FIG. 3.

[2] Long-term Reliability Experiment

A long-term reliability experiment involving the quantum dot-polymer composite article is performed according to the same method as described in Example 5-1. As a result, the quantum dot-polymer composite article substantially maintains initial luminance up to at least 800 hours (e.g., greater than or equal to about 1,000 hours).

Example 7

Quantum Dot-polymer Composite Article III

[1] A quantum dot-monomer composition is obtained according to the same method as described in Example 5-1. The composition is vacuum-dried at room temperature for 1 hour to remove chloroform included therein.

1 g of the quantum dot composition is drop-casted on the surface of the clay-polymer composite III of the barrier film according to Example 3. The surface of the clay composite of the barrier film is stacked to contact the quantum dot composition, and a resulting material obtained therefrom is UV-cured (light intensity: 100 mW/cm$^2$) for 4 minutes to obtain a quantum dot-polymer composite article as shown in FIG. 3.

[2] Long-term Reliability Experiment

A long-term reliability experiment involving the quantum dot-polymer composite article is performed according to the same method as described in Example 5-1. As a result, the quantum dot-polymer composite article substantially maintains initial luminance up to at least 800 hours (e.g., greater than or equal to 1,000 hours).

Example 8

Quantum Dot-polymer Composite Article IV

[1] A quantum dot-monomer composition is obtained according to the same method as described in Example 5-1. The obtained composition is vacuum-dried at room temperature for one hour to remove chloroform included therein.

1 g of the quantum dot composition is drop-casted on the surface of the clay-polymer composite IV of the barrier film according to Example 4. The surface of the clay composite of the barrier film is stacked to contact the quantum dot composition, and a resulting material obtained therefrom is UV-cured (light intensity: 100 mW/cm$^2$) for 4 minutes to obtain a quantum dot-polymer composite article as shown in FIG. 3.

[2] Long-term Reliability Experiment

A long-term reliability experiment involving the quantum dot-polymer composite article is performed according to the same method as described in Example 5-1. As a result, the quantum dot-polymer composite article substantially maintains initial luminance up to at least 800 hours (e.g., greater than or equal to 1,000 hours).

Comparative Example 8

Quantum Dot-polymer Composite Article

[1] A quantum dot-monomer composition is obtained according to the same method as described in Example 5-1. The composition is vacuum-dried at room temperature for 1 hour to remove chloroform included therein.

1 g of the quantum dot composition is drop-casted on the barrier layer surface of the SiO$_x$ barrier film according to Comparative Example 2. The polymer film is stacked on the quantum dot composition, and a resulting material obtained therefrom is UV-cured (light intensity: 100 mW/cm$^2$) for 4 minutes to obtain a quantum dot-polymer composite article.

[2] Long-term Reliability Experiment

A long-term reliability experiment involving the quantum dot-polymer composite article is performed according to the same method as described in Example 5-1. The quantum dot-polymer composite article substantially maintained initial luminance up to at least 800 hours (e.g., greater than or equal to 1,000 hours). Accordingly, the clay-polymer composites of Examples 5 to 8 have equivalent performance compared to that of a common barrier film including a metal oxide (SiO$_x$) thin film.

Comparative Example 9

Quantum Dot-polymer Composite Article

[1] A quantum dot-monomer composition is obtained according to the same method as described in Example 5-1. The obtained composition is vacuum-dried at room temperature for 1 hour to remove chloroform included therein.

1 g of the quantum dot composition is drop-casted on the overcoat surface of the barrier film of Comparative Example 4. The polymer film is stacked on the quantum dot composition, and a resulting material obtained therefrom is UV-cured (light intensity: 100 mW/cm$^2$) for 4 minutes to obtain a quantum dot-polymer composite article.

[2] Long-term Reliability Experiment

A long-term reliability experiment involving the quantum dot-polymer composite article is performed according to the same method as described in Example 5-1. As a result, the quantum dot-polymer composite article shows remarkably decreased luminance from the initial luminance after 1,000 hours, and thus shows insufficient long-term reliability.

Comparative Example 10

Quantum Dot-polymer Composite Article

[1] A quantum dot-monomer composition is obtained according to the same method as described in Example 5-1. The obtained composition is vacuum-dried at room temperature for one hour to remove chloroform included therein.

1 g of the quantum dot composition is drop-casted on the barrier film surface based on the TMPMA according to Comparative Example 5. The polymer film is stacked on the quantum dot composition, and a resulting material obtained therefrom is UV-cured (light intensity: 100 mW/cm$^2$) for 4 minutes to obtain a quantum dot-polymer composite article.

[2] Long-term Reliability Experiment

A long-term reliability experiment involving the quantum dot-polymer composite article is performed according to the same method as described in Example 5-1. As a result, the quantum dot-polymer composite article shows remarkably decreased luminance from the initial luminance after 1,000 hours, and thus shows insufficient long-term reliability.

While this inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A barrier coating composition comprising:
a monomer combination comprising a first monomer comprising at least two thiol groups at its terminal end and a second monomer comprising at least two carbon-carbon unsaturated bond-containing groups at its terminal end; and
a plurality of organo-modified clay particles dispersed in the monomer combination,
wherein the organo-modified clay particles comprise a compound comprising a hydrocarbyl group linked to a heteroatom,
wherein an amount of the clay particles is greater than or equal to about 1 parts by weight based on 100 parts by weight of the monomer combination
wherein the compound is a secondary or tertiary amine, a quaternary organoammonium salt, a primary, secondary, or tertiary phosphine, a quaternary organophosphonium salt, a thiol comprising an amine group, or a combination thereof, and
wherein the barrier coating composition is polymerized to form a barrier coating having transmittance of greater than or equal to about 90% for visible light.

2. The barrier coating composition of claim 1, wherein the amount of the clay particles is about 1 to about 20 parts by weight based on 100 parts by weight of the monomer combination.

3. The barrier coating composition of claim 1, wherein the clay particles comprise smectite clay, mica clay, vermiculite clay, montmorillonite clay, iron-containing montmorillonite clay, beidellite clay, saponite clay, hectorite clay, stibensite clay, nontronite clay, anionic clay, zirconium phosphate, kaolinite, atapulgite, illite, halloysite, diatomaceous earth, fuller's earth, calcined aluminum silicate, hydrated aluminum silicate, magnesium aluminum silicate, sodium silicate, magnesium silicate, or a combination thereof.

4. The barrier coating composition of claim 1, wherein the compound is a secondary or tertiary amine compound comprising at least one substituted or unsubstituted C6 to C20 hydrocarbyl group linked to a nitrogen atom, a quaternary organoammonium salt compound comprising at least one substituted or unsubstituted C6 to C20 hydrocarbyl group linked to a nitrogen atom, a primary, secondary, or tertiary phosphine compound comprising at least one substituted or unsubstituted C6 to C20 hydrocarbyl group linked to a phosphorus atom, an organophosphonium salt compound comprising at least one substituted or unsubstituted C6 to C20 hydrocarbyl group linked to a phosphorus atom, a C6 or greater thiol compound comprising an amine group ($H_2N$—) or a combination thereof.

5. The barrier coating composition of claim 1, wherein the compound is n-hexyltrimethyl ammonium salt, a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, a triethyloctylphosphonium salt, a tetraphenylphosphonium salt, or a combination thereof.

6. The barrier coating composition of claim 1, wherein the clay particle has an average of a longest diameter of about 50 nanometers to about 10 micrometers, and an average thickness of about 1 nanometer to about 10 nanometers.

7. The barrier coating composition of claim 1, wherein the first monomer is represented by Chemical Formula 1 and the second monomer is represented by Chemical Formula 2:

Chemical Formula 1

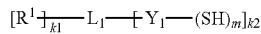

wherein, in Chemical Formula 1,
$R^1$ is hydrogen; a substituted or unsubstituted C1 to C30 linear or branched alkyl group; a substituted or unsubstituted C6 to C30 aryl group; a substituted or unsubstituted C7 to C30 arylalkyl group; a substituted or unsubstituted C3 to C30 heteroaryl group; a substituted or unsubstituted C4 to C30 heteroarylalkyl group; a substituted or unsubstituted C3 to C30 cycloalkyl group; a substituted or unsubstituted C3 to C30 heterocycloalkyl group; a C1 to C10 alkoxy group; hydroxy group; —$NH_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group),
$L_1$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C6 to C30 heteroarylene group, wherein a non-adjacent methylene (—$CH_2$—) of the substituted C1 to C30 alkylene group is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 alkyl group), or a combination thereof,
$Y_1$ is a single bond; substituted or unsubstituted C1 to C30 alkylene group; a substituted or unsubstituted C2 to C30 alkenylene group; or a C1 to C30 alkylene group or a C2 to C30 alkenylene group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof,
m is an integer of 1 or more,
k1 is an integer of 1 or more and k2 is an integer of 1 or more, and
the sum of m and k2 is an integer of 3 or more,
provided that m does not exceed the valence of $Y_1$, and provided that the sum of k1 and k2 does not exceed the valence of $L_1$;

Chemical Formula 2

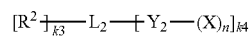

wherein, in Chemical Formula 2,
X is an aliphatic organic group having a carbon-carbon double bond or a carbon-carbon triple bond, an aromatic organic group having a carbon-carbon double bond or a carbon-carbon triple bond, or an alicyclic organic group having a carbon-carbon double bond or a carbon-carbon triple bond,
$R^2$ is hydrogen; a substituted or unsubstituted C1 to C30 linear or branched alkyl group; a substituted or unsubstituted C6 to C30 aryl group; a substituted or unsubstituted C7 to C30 arylalkyl group; a substituted or unsubstituted C3 to C30 heteroaryl group; a substituted or unsubstituted C3 to C30 heteroarylalkyl group; a substituted or unsubstituted C3 to C30 cycloalkyl group; a substituted or unsubstituted C3 to C30 heterocycloalkyl group; a C1 to C10 alkoxy group; a hydroxy group; $NH_2$; a substituted or unsubstituted C1 to C30 amine group (—NRR', wherein R and R' are independently hydrogen or a C1 to C30 linear or branched alkyl group); an isocyanate group; a halogen; —ROR' (wherein R is a substituted or unsubstituted C1 to C20 alkylene group and R' is hydrogen or a C1 to C20 linear or branched alkyl group); an acyl halide (—RC(=O)X, wherein R is a substituted or unsubstituted alkylene group and X is a halogen); —C(=O)OR' (wherein R' is hydrogen or a C1 to C20 linear or branched alkyl group); —CN; or —C(=O)ONRR' (wherein R and R' are independently hydrogen or a C1 to C20 linear or branched alkyl group),
$L_2$ is a carbon atom, a substituted or unsubstituted C1 to C30 alkylene group, a substituted or unsubstituted C6 to C30 cycloalkylene group, a substituted or unsubstituted C6 to C30 arylene group, or a substituted or unsubstituted C3 to C30 heteroarylene group,
$Y_2$ is a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, n is an integer of 1 or more,
k3 is an integer of 0 or more, k4 is an integer of 1 or more, and the sum of n and k4 is an integer of 3 or more, provided that n does not exceed the valence of $Y_2$, and provided that the sum of k3 and k4 does not exceed the valence of $L_2$.

8. The barrier coating composition of claim 7, wherein the first monomer of the Chemical Formula 1 comprises a monomer represented by Chemical Formula 1-1:

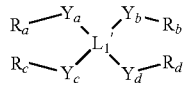

Chemical Formula 1-1 wherein, in Chemical Formula 1-1, $L_1'$ is carbon, a substituted or unsubstituted C6 to C30 arene-derived group; a substituted or unsubstituted C3 to C30 heteroarene-derived group; a substituted or unsubstituted C3 to C30 cycloalkane-derived group; or a substituted or unsubstituted C3 to C30 heterocycloalkane-derived group, $Y_a$ to $Y_d$ are each independently a single bond; a substituted or unsubstituted C1 to C30 alkylene group; a substituted or unsubstituted C2 to C30 alkenylene group; or a C1 to C30 alkylene group or a C2 to C30 alkenylene group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R_a$ to $R_d$ are each independently $R^1$ of Chemical Formula 1 or SH, provided that at least two of $R_a$ to $R_d$ is SH.

9. The barrier coating composition of claim 7, wherein the first monomer represented by Chemical Formula 1 is a compound represented by Chemical Formula 1-2, pentaerythritol tetrakis (3-mercaptopropionate) of Chemical Formula 1-3, pentaerythritol tetrakis (2-mercaptoacetate) of Chemical Formula 1-4, tris[2-(3-mercaptopropinonyloxy) alkyl] isocyanurate of Chemical Formula 1-5, a compound of Chemical Formula 1-6, a compound of Chemical Formula 1-7, a compound of Chemical Formula 1-8, or a combination thereof:

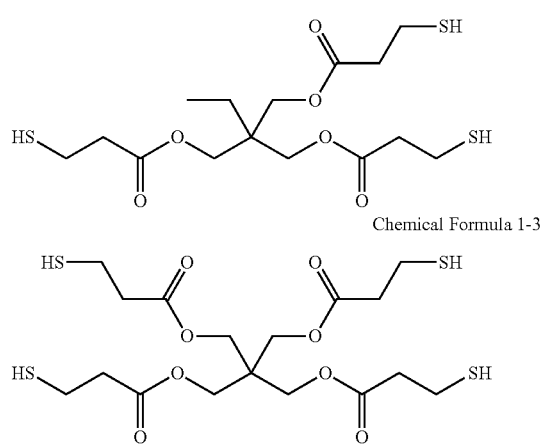

Chemical Formula 1-2

Chemical Formula 1-3

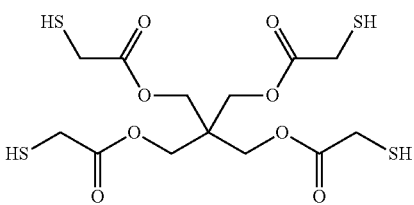

Chemical Formula 1-4

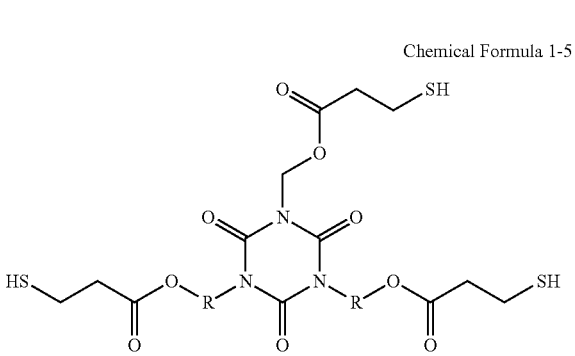

Chemical Formula 1-5 wherein, in Chemical Formula 1-5, R is a substituted or unsubstituted C1 to C10 alkylene;

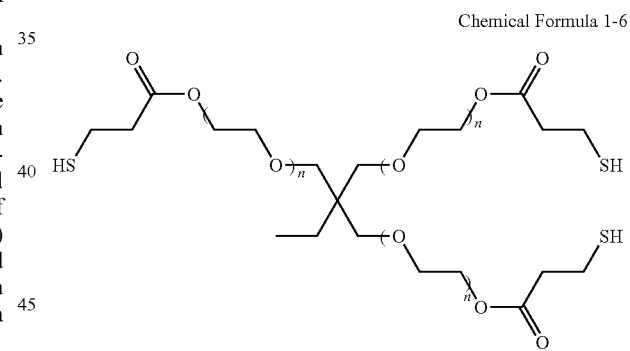

Chemical Formula 1-6 wherein n is an integer of 1 to 20,

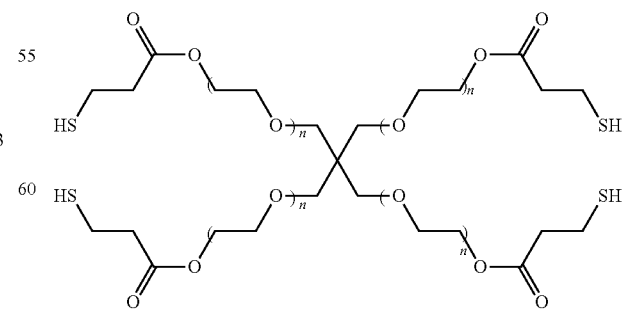

Chemical Formula 1-7 wherein n is an integer of 1 to 20, and

Chemical Formula 1-8

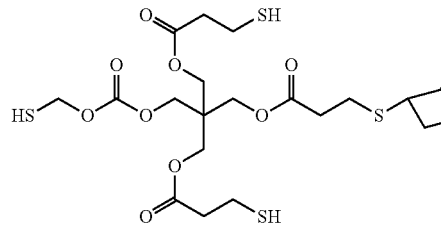

wherein n is an integer of 1 to 20.

10. The barrier coating composition of claim 7, wherein the second monomer represented by Chemical Formula 2 is a compound represented by Chemical Formula 2-1, Chemical Formula 2-2, Chemical Formula 2-3, or a combination of the foregoing compounds:

Chemical Formula 2-1

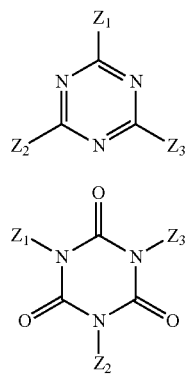

Chemical Formula 2-2

Chemical Formula 2-3

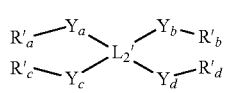

wherein, in Chemical Formulae 2-1 and 2-2, $Z_1$ to $Z_3$ are each independently *—$Y_2$—$X_n$ as defined for the Chemical Formula 2;

wherein, in Chemical Formula 2-3,
$L_2'$ is carbon; a substituted or unsubstituted C1 to C30 alkane-derived group; a substituted or unsubstituted C2 to C30 alkene-derived group; a C1 to C30 alkane-derived group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), a C6 to C10 cycloalkylene group, or a combination thereof; a C2 to C30 alkene-derived group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), a C6 to C10 tetravalent cycloalkane-derived group, or a combination thereof; a substituted or unsubstituted C6 to C30 arene-derived group; a substituted or unsubstituted C3 to C30 heteroarene-derived group; a substituted or unsubstituted C3 to C30 cycloalkane-derived group; or a substituted or unsubstituted C3 to C30 heterocycloalkane-derived group, each of $Y_a$ to $Y_d$ are each independently a single bond; a substituted or unsubstituted C1 to C30 alkylene group; a substituted or unsubstituted C2 to C30 alkenylene group; or a C1 to C30 alkylene group or C2 to C30 alkenylene group wherein at least one methylene (—$CH_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and $R'_a$ to $R'_d$ are $R^2$ of Chemical Formula 2 or X of Chemical Formula 2, provided that at least two of $R'_a$ to $R'_d$ are X of Chemical Formula 2.

11. The barrier coating composition of claim 7, wherein the second monomer is a compound represented by Chemical Formula 2-4, a compound represented by Chemical Formula 2-5, a compound represented by Chemical Formula 2-6, a compound represented by Chemical Formula 2-7, a compound represented by Chemical Formula 2-8, a compound represented by Chemical Formula 2-9, a compound represented by Chemical Formula 2-10, a compound represented by Chemical Formula 2-11, a compound represented by Chemical Formula 2-12, a compound represented by Chemical Formula 2-13, a compound represented by Chemical Formula 2-14, a compound represented by Chemical Formula 2-15, or a combination thereof:

Chemical Formula 2-4

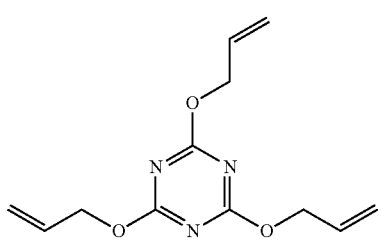

Chemical Formula 2-5

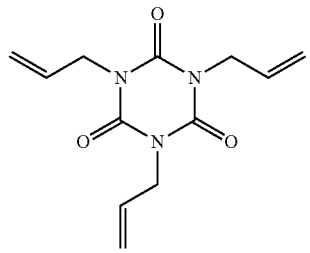

Chemical Formula 2-6

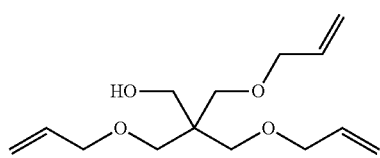

Chemical Formula 2-7

wherein, in Chemical Formula 2-7,
$R_1$ is a C1 to C20 alkylene group, or a C1 to C20 alkylene group wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and
$R_2$ is hydrogen or a methyl group;

Chemical Formula 2-8

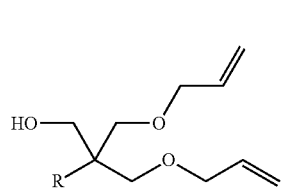

wherein, in Chemical Formula 2-8,
R is a C1 to C10 alkyl group;

Chemical Formula 2-9

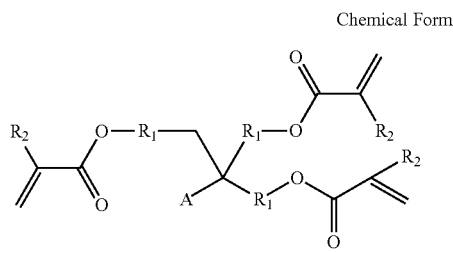

wherein, in Chemical Formula 2-9,
A is a C1 to C10 alkyl group or a hydroxy group, $R_1$ is a single bond, a C1 to C20 alkylene group, a C1 to C20 alkylene wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and
$R_2$ is hydrogen or a methyl group;

Chemical Formula 2-10

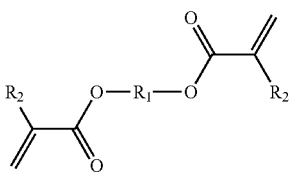

wherein, in Chemical Formula 2-10,
$R_1$ is a single bond, a C1 to C20 alkylene, or C1 to C20 alkylene wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, and
$R_2$ is hydrogen or a methyl group;

Chemical Formula 2-11

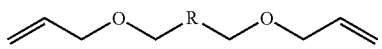

wherein, in Chemical Formula 2-11,
R is a single bond, a C1 to C20 alkylene, or C1 to C20 alkylene wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, Chemical Formula 2-12

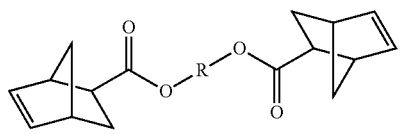

wherein, in Chemical Formula 2-12,
R is C1 to C20 alkylene, or C1 to C20 alkylene wherein at least one methylene (—CH$_2$—) is replaced by sulfonyl (—S(=O)$_2$—), carbonyl (—C(=O)—), ether (—O—), sulfide (—S—), sulfoxide (—S(=O)—), ester (—C(=O)O—), amide (—C(=O)NR—) (wherein R is hydrogen or a C1 to C10 linear or branched alkyl group), imine (—C(=NR)—) (wherein R is hydrogen or a C1 to C10 linear or branched alkyl group), or a combination thereof, Chemical Formula 2-13

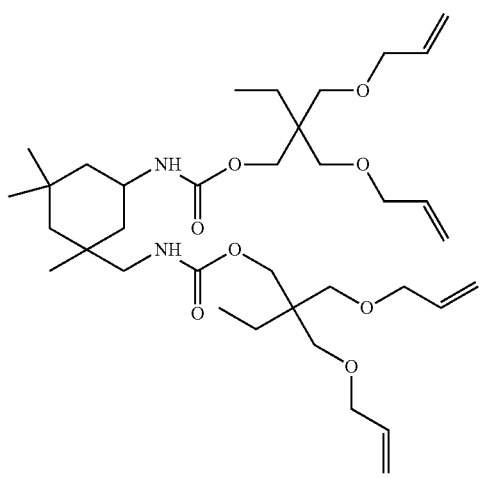

Chemical Formula 2-14

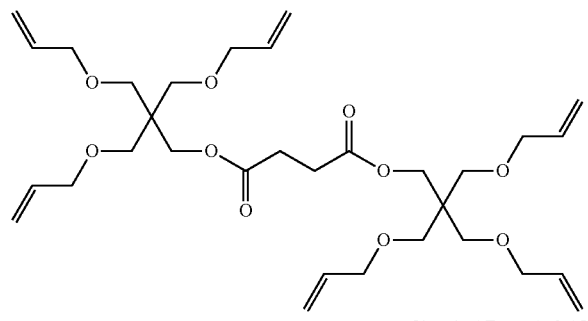

Chemical Formula 2-15

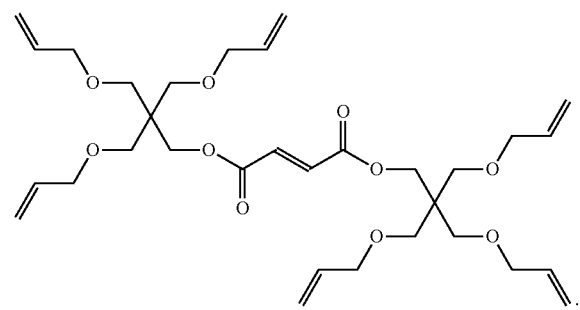

12. The barrier coating composition of claim 1, wherein in the monomer combination, the first monomer and the second monomer are present in such amounts that a mole ratio of the thiol group of the first monomer to the carbon-carbon unsaturated bond of the second monomer is about 1: about 0.1 to 10.

13. A clay-polymer composite for a barrier coating, comprising
a cross-linked polymerization product of a monomer combination comprising a first monomer having at least two thiol (—SH) groups at its terminal end and a second monomer having at least two carbon-carbon unsaturated bond-containing groups at its terminal end; and
a plurality of organo-modified clay particles dispersed in the cross-linked polymerization product,
wherein the organo-modified clay particles comprise a compound having a hydrocarbyl group linked to a heteroatom,
wherein an amount of the clay particles is greater than or equal to about 1 parts by weight based on 100 parts by weight of the monomer combination and the barrier coating has transmittance of greater than or equal to about 90% for visible light, and
wherein the compound is a secondary or tertiary amine, a quaternary organoammonium salt, a primary, secondary, or tertiary phosphine, a quaternary organophosphonium salt, a thiol comprising an amine group, or a combination thereof.

14. The clay-polymer composite for a barrier coating of claim 13, wherein an amount of the clay particles is about 1 to about 20 percent by weight based on the total weight of the clay-polymer composite.

15. The clay-polymer composite for a barrier coating of claim 13, wherein the clay-polymer composite has oxygen transmittance rate of less than or equal to 5 cubic centimeters per square meter per day per atmosphere measured at 23° C. under relative humidity of 0% according to JIS K 7126-2 or ASTM D 3985.

16. The clay-polymer composite for a barrier coating of claim 13, wherein the clay particles comprise smectite clay, mica clay, vermiculite clay, montmorillonite clay, iron-containing montmorillonite clay, beidellite clay, saponite clay, hectorite clay, stibensite clay, nontronite clay, anionic clay, zirconium phosphate, kaolinite, atapulgite, illite, halloysite, diatomaceous earth, fuller's earth, calcined aluminum silicate, hydrated aluminum silicate, magnesium aluminum silicate, sodium silicate, magnesium silicate, or a combination thereof.

17. The clay-polymer composite for a barrier coating of claim 13, wherein the compound comprises a secondary or tertiary amine compound comprising at least one substituted or unsubstituted C6 to C20 hydrocarbyl group linked to a nitrogen atom, a quaternary organoammonium salt compound comprising at least one substituted or unsubstituted C6 to C20 hydrocarbyl group linked to a nitrogen atom, a primary, secondary, or phosphine compound comprising at least one substituted or unsubstituted C6 to C20 hydrocarbyl group linked to a phosphorus atom, an organophosphonium salt compound comprising at least one substituted or unsubstituted C6 to C20 hydrocarbyl group linked to a phosphorus atom, and a C6 or greater thiol compound comprising an amine group, or a combination thereof.

18. The clay-polymer composite for a barrier coating of claim 13, wherein the compound comprises a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, a triethyloctylphosphonium salt, and a tetraphenylphosphonium salt, or a combination thereof.

19. The clay-polymer composite for a barrier coating of claim 13, wherein the clay particles have a longest average diameter of about 50 nanometers to about 10 micrometers, and an average thickness of about 1 nanometer to about 10 nanometers.

20. A quantum dot-polymer composite article comprising:
a quantum dot-polymer composite comprising a polymer host matrix and a plurality of quantum dots dispersed in the polymer host matrix; and
a barrier coating disposed on at least a portion of the surface of the quantum dot polymer composite,
wherein the barrier coating comprises a cross-linked polymerization product of a monomer combination comprising a first monomer having at least two thiol groups at its terminal end and a second monomer having at least two carbon-carbon unsaturated bond-containing groups at its terminal end, and a plurality of organo-modified clay particles dispersed in the cross-linked polymerization product, wherein the organo-modified clay particles comprise a compound having a hydrocarbyl group linked to a heteroatom, wherein an amount of the clay particles is greater than or equal to about 1 parts by weight based on 100 parts by weight of the monomer combination and the barrier coating has transmittance of greater than or equal to about 90% for visible light, and wherein the compound is a secondary or tertiary amine, a quaternary organoammonium salt, a primary, secondary, or tertiary phosphine, a quaternary organophosphonium salt, a thiol comprising an amine group, or a combination thereof.

21. The quantum dot-polymer composite article of claim 20, wherein the polymer host matrix comprises a cross-linked polymerization product of a first monomer having at least two thiol (—SH) groups at its terminal end and a second monomer having at least two carbon-carbon unsaturated bond-containing groups at its terminal end, a cross-linked or uncross-linked poly(meth)acrylate resin, a melamine(meth)acrylate resin, an epoxy resin, an epoxy(meth)acrylate resin, a silicone resin, a silicon(meth)acrylate resin, a polyurethane(meth)acrylate resin, a vinyl polymer, or a combination thereof.

22. The quantum dot-polymer composite article of claim 20, wherein the quantum dot-polymer composite has a sheet shape, a bar shape, a pipe shape, or a tube shape.

23. The quantum dot-polymer composite article of claim 20, wherein the clay particle comprises smectite clay, mica clay, vermiculite clay, montmorillonite clay, iron-containing montmorillonite clay, beidellite clay, saponite clay, hectorite clay, stibensite clay, nontronite clay, anionic clay, zirconium phosphate, kaolinite, atapulgite, illite, halloysite, diatomaceous earth, fuller's earth, calcined aluminum silicate, hydrated aluminum silicate, magnesium aluminum silicate, sodium silicate, magnesium silicate, or a combination thereof.

24. The quantum dot-polymer composite article of claim 20, wherein the compound comprises a secondary or tertiary amine compound comprising at least one substituted or unsubstituted C6 to C20 hydrocarbyl group linked to a nitrogen atom, a quaternary organoammonium salt compound comprising at least one substituted or unsubstituted C6 to C20 hydrocarbyl group linked to a nitrogen atom, a primary, secondary, or tertiary phosphine compound comprising at least one substituted or unsubstituted C6 to C20 hydrocarbyl group linked to a phosphorus atom, an organophosphonium salt compound comprising at least one substituted or unsubstituted C6 to C20 hydrocarbyl group linked to a phosphorus atom, and a C6 or greater thiol compound comprising an amine group, or a combination thereof.

25. The quantum dot-polymer composite article of claim 20, wherein the compound comprises a dioctadecyldimethylammonium salt, a methyltrioctylammonium salt, a hexyltriphenylphosphonium salt, a tributylmethylphosphonium salt, a triethylpentylphosphonium salt, 8-amino-1-octanethiol, a triethyloctylphosphonium salt, and a tetraphenylphosphonium salt, or a combination thereof.

26. The quantum do-polymer composite article of claim 20, wherein the clay particles have a longest average diameter of about 50 nanometers to about 10 micrometers, and an average thickness of about 1 nanometer to about 10 nanometers.

27. An electronic device comprising the quantum dot-polymer composite article of claim 20.

28. The electronic device of claim 27, wherein the electronic device is a display, a light emitting device, a memory device, a laser device, or a solar cell.

29. The electronic device of claim 28, wherein the light emitting device comprises a light source and the quantum dot-polymer composite article positioned on the light source.

* * * * *